United States Patent Office 3,306,862
Patented Feb. 28, 1967

3,306,862
GAS-PRODUCING COMPOSITIONS AND METHOD OF MAKING CELLULAR BODIES
Orville L. Mageli and Chester S. Sheppard, Kenmore, and Harry Norman Schack, Buffalo, N.Y., assignors to Wallace & Tiernan Inc., Belleville, N.J., a corporation of Delaware
No Drawing. Filed July 7, 1964, Ser. No. 380,939
30 Claims. (Cl. 260—2.5)

This invention relates to gas-producing compositions comprising compounds subject to decomposition at moderately elevated temperatures with plentiful evolution of gas. The invention relates further to compositions for producing cellular bodies upon heating, and more specifically to compositions comprising polymeric organoplastic materials in admixture with a gas-producing composition. The invention involves also the method of making cellular bodies involving generally the formulation and subsequent heating of such organoplastic blowing compositions.

This application is a continuation-in-part of copending applications Serial Nos. 299,152 and 299,161, both filed August 1, 1963, and now abandoned, and Serial No. 329,301, filed December 9, 1963, these applications being assigned to the same assignee as that of the present invention.

Large numbers of blowing agents have been proposed for use in producing foamed organoplastic materials. Some of the more important blowing agents are nitrogen-containing compounds, such as azo, hydrazido, and nitroso compounds, which decompose under suitable conditions with the evolution of nitrogenous and frequently also carbonaceous gas. For example, 1,1'-azobisformamide, or azodicarbonamide, has found great utility as a blowing agent in the manufacture of rubber and plastic foams.

It also has been proposed to produce cellular bodies by heating mixtures of polyvinyl chloride with, for example, the diethyl ester of azodiformic acid (azodicarboxylic acid) to temperatures in the neighborhood of 160° C. However, in formulating blowing compositions it is necessary to insure that the gas-producing material in the composition will decompose, with the evolution of adequate quantities of suitable gases, at a temperature which is not excessive and at which the organoplastic material has a fluidity and related characteristics which will support the formation of the desired cellular structure throughout the body of the material. This necessity is recognized in the plastic foam art, and it has led to a need for blowing agents which can be chosen and controlled to decompose dependably and rapidly at a predetermined temperature. For example, attempts to use diethyl azodiformate for this purpose in simple admixture with an organoplastic material tend to give no gas evolution at temperatures substantially below, and rather little gas evolution even at, the boiling point of this diester, which approaches 240° C. in air.

Furthermore, the gas-producing or blowing compound should be chosen so that the gas evolved is not flammable, and also is noncorrosive and hence free of nitrogen dioxide. The blowing agent used should be inexpensive to prepare, should be readily dispersible or soluble in the compositions to be foamed, should be stable in storage, and should not leave a residue having color or staining characteristics, unpleasant odor, toxicity, or any effect on the physical and chemical properties of the plastic to be foamed.

It thus appears that a class of foaming agents and foamable compositions having the desirable properties suggested hereinabove and providing a broad choice of gas-releasing temperatures would be most desirable and useful, especially when the foaming agent provides gas yields which, over a definite and narrow temperature range for each composition, are sufficient in amount to indicate extensive decomposition and which are made up primarily of nitrogen with or without carbon dioxide or other suitable carbonaceous gas. When it is desired to provide a foamable composition including a particular organoplastic material which has its best blowing characteristics at a certain narrow range of temperatures, it frequently happens that no blowing agent is available for inclusion in the composition to produce copious quantities of suitable gas at such temperatures.

It is an object of this invention, therefore, to provide new and improved gas-producing compositions which avoid one or more of the disadvantages of prior art compositions.

It is another object of the invention to provide a method of making cellular bodies, and compositions for producing such bodies upon heating, which likewise avoid one or more of the disadvantages of the heretofore-proposed methods and compositions.

It is a further object of the invention to provide new gas-producing compositions and new compositions for producing cellular bodies which develop large amounts of gas by decomposition of a component at a definite and limited predetermined range of temperatures.

It is a still further object of the invention to provide an improved method of making cellular bodies whereby the fluidity-temperature characteristic of a polymeric organoplastic material is matched properly to the decomposition properties of a blowing agent so as to facilitate the foaming operation.

In accordance with the invention, a gas-producing composition consists essentially of a diester of azodiformic acid represented by the structural formula $$R^1.OCO.N:N.COO.R^2$$

and of an activator for promoting gas-releasing decomposition of that diester of azodiformic acid at elevated temperatures in the form of a metallic compound having unneutralized Lewis acid properties and distributed throughout the composition in an amount by weight equal to at least 1% of the weight of the diester; the radical —$R^1$ in the above-represented diester being selected from the group consisting of (a) alkyl, haloalkyl, aralkyl, cycloalkyl, alkenyl, alkynyl, phenyl, halophenyl, and alkylphenyl radicals having not more than 12 carbon atoms, and (b) the radical $R^2.OCO.N:N.COO.R^3$—, in which —$R^3$— is selected from the group consisting of the radical —$(C_mH_{2m})$— where $m$ is a number from 2 to 10 and of the radical —$CH_2.CH_2(Y.CH_2.CH_2)_n$— where $n$ is a number from 1 to 3 and Y is selected from the group consisting of oxygen and sulfur; the radical —$R^2$ in the above-represented diester being selected from the group consisting of the aforementioned radicals (a).

Also in accordance with the invention, a composition for producing cellular bodies upon heating comprises a polymeric material which exhibits a fluidity-temperature characteristic permitting formation of cellular structure upon heating and consequent release of gas throughout a body of such material; this composition further comprises a material for releasing gas upon heating, distributed throughout the composition in the form of a diester of azodiformic acid represented by the structural formula $R^1.OCO.N:N.COO.R^2$, where the radicals —$R^1$ and —$R^2$ are selected from the respective groups defined hereinabove; and this composition additionally comprises an activator for the aforementioned gas releasing material, distributed throughout the composition in the form of a metallic compound having unneutralized Lewis acid properties.

In accordance with a method aspect of the invention, the method of making cellular bodies comprises forming a mixture including a polymeric material likewise exhibiting a fluidity-temperature characteristic permitting formation of cellular structure upon release of gas throughout a body of the material at an elevated temperature, incorporating in the mixture a material for releasing gas upon heating, and also incorporating in the mixture an activator for the gas-releasing material, the gas-releasing material being the diester of azodiformic acid represented by the structural formula $R^1.OCO.N:N.COO.R^2$ as defined hereinabove, and the activator being the aforementioned metallic compound having unneutralized Lewis acid properties; the method additionally comprises heating a portion of this mixture to effect gas-releasing decomposition of the above-defined diester of azodiformic acid, at a rate of gas release determined by the presence of the activator under the elevated temperature conditions attained, for expanding such portion of the mixture into a cellular body.

In accordance with a feature of the invention, the polymeric material utilized in the aforesaid composition for producing cellular bodies upon heating, and in the aforesaid method of making cellular bodies, is a polyolefin hydrocarbon material.

In accordance with another feature of the invention, the polymeric material utilized in the aforesaid composition for producing cellular bodies upon heating, and in the aforesaid method of making cellular bodies, is a vinyl chloride polymeric material.

For a better understanding of the invention, together with other and further objects thereof, reference is had to the following description, and its scope will be pointed out in the appended claims.

A gas-producing composition embodying the invention consists essentially not only of a diester of azodiformic acid or azodicarboxylic acid, $HOCO.N:N.COOH$, in which the two azobis (formyloxy) ester linkages,

—OCO.N:N.COO— carry radicals selected from a group set forth hereinbelow, but also of an activator for promoting gas-releasing decomposition of the diester of azodiformic acid at moderately elevated temperatures. The activator serves one or both of two functions, one of which is to effect blowing or gas evolution at a predetermined moderately elevated temperature for those diesters of azodiformic acid which are otherwise stable at their normal boiling points, or to effect blowing or gas evolution at a predetermined temperature which is substantially lower than the normal decomposition temperature for those diesters of azodiformic acid which do decompose when heated without additives or substantial impurities, the other function being to increase materially the amount of gas evolved at the blowing temperature per gram of diester. It will be understood that the lowering of the decomposition temperature or increase in the amount of gas evolved varies according to the nature of the activator and, when certain activators are present in relatively small amounts, according to the proportion of the activator present.

The diester of azodiformic acid included in this gas-producing composition may be represented by the structural formula $R^1.OCO.N:N.COO.R^2$. In this formula the radical —$R^1$ is selected from a group consisting of several types of radicals, which for convenience may be separated into subgroups (a) and (b). The radicals designated (a) are the alkyl, haloalkyl, aralkyl, cycloalkyl, alkenyl, alkynyl, phenyl, halophenyl, and alkylphenyl radicals having not more than 12 carbon atoms. Among the alkyl radicals of the subgroup (a) may be mentioned particularly the methyl, ethyl, butyl, isobutyl, tert-butyl, and dodecyl radicals and the secondary alkyl radicals isopropyl, sec-butyl, and sec-octyl or 1-methylheptyl. Typical of other radicals having not more than 12 carbon atoms, as listed hereinabove, are the 2-chloroethyl radical exemplifying haloalkyl radicals, the benzyl and α,α-dimethylbenzyl radicals exemplifying aralkyl radicals, the cyclopentyl radical, the cyclohexyl radical, and the 4-(cyclohexyl)cyclohexyl or (bicyclohexyl)-4- radical exemplifying cycloalkyl radicals, the allyl and 3,7-dimethyl-6-octenyl radicals exemplifying alkenyl radicals, and the 2-propynyl, 1,1-dimethyl-2-propynyl, and 1-(1-ethylpentyl)-2-propynyl radicals exemplifying alkynyl radicals, by which is meant acetylenic acyclic hydrocarbon radicals. Typical of the remaining radicals having not more then 12 carbon atoms, as listed hereinabove, are the 2,4,6-trichlorophenyl radical exemplifying halophenyl radicals and the p-tolyl, 2,4-xylyl and mesityl radicals exemplifying alkylphenyl radicals. Numerous other radicals, coming under the categories included in subgroup (a) and closely related to the aforementioned examples of radicals having not more than 12 carbon atoms, will occur to those skilled in the art as being capable of incorporation as the radical —$R^1$ in the azodiformate diester by methods analogous to those used in preparing the diesters having the aforementioned radicals, giving diesters similarly suitable for inclusion in the gas-producing compositions. It should be noted also that certain heterocyclic radicals, including particularly the 2-thenyl radical, may be incorporated in the diester as the radical —$R^1$ with equivalent results.

The radicals designated (b) may be represented by the structural formula $R^2.OCO.N:N.COO.R^3$—. In this radical group the radical —$R^2$ conveniently is the same as the radical —$R^2$ in the full structural formula of the diester, and is defined hereinbelow, while the bivalent radical —$R^3$— is selected from the group consisting of the radical —$(C_mH_{2m})$— where $m$ is a number from 2 to 10, and of the radical —$CH_2.CH_2(Y.CH_2.CH_2)_n$— where $n$ is a number from 1 to 3 and Y is selected from the group consisting of oxygen and sulfur. When the alkylene radical —$(C_mH_{2m})$— has all of its carbon atoms in a straight chain it is the ethylene radical —$CH_2.CH_2$— or one of the longer polymethylene radicals, giving diesters having the structure $$R^2.OCO.N:N.COO(CH_2)_m—OCO.N:N.COO.R^2$$

where $m$ is 2 through 10. While these compounds are diesters in the sense that the hydrogen atoms of both of the carboxy groups of the azodiformic acid are replaced by substituents, as in all diesterified dicarboxylic acids, it will be appreciated that such compounds include two azobis(formyloxy) groups joined by the alkylene radical. The prototype of these compounds, in which $m$ is 2 and —$R^3$— is the ethylene radical —$CH_2CH_2$—, is the ester of ethylene glycol with monomethyl azodiformate, $$CH_3.OCO.N:N.COO.CH_2.CH_2.OCO.N:N.COO.CH_3$$

—$R^2$ in this case being the methyl radical. The ester of ethylene glycol with monoethyl azodiformate, ethylene bis(ethyl azodiformate), similarly may be mentioned. It will be appreciated that the ester of 1,3-propanediol (trimethylene glycol) with a monoalkyl azodiformate, where $m$ is 3, and related diesters where —$R^3$— is a higher polymethylene radical or a branched chain alkylene radical having not more than 10 carbon atoms, have related properties.

When —$R^3$— is the oxydiethylene radical

—$CH_2.CH_2.O.CH_2.CH_2$— the diester, which again contains two azobis(formyloxy) groups, is the ester of diethylene glycol with a monoesterified azodiformate, for example diethylene bis(ethyl azodiformate), $$C_2H_5.OCO.N:N.COO.CH_2.CH_2.O.CH_2.$$
$$CH_2.OCO.N:N.COO.C_2H_5$$

When —$R^3$— is the thiodiethylene radical

—$CH_2.CH_2.S.CH_2.CH_2$— the compounds of course have the same structural formulas except that the central atom is —S— instead of —O—, as in the ester of 2,2'-thiodiethanol (thiodiethylene glycol) with monoethyl azodiformate. These examples illustrate the form of the radical —R³— when it has the structural formula —CH₂.CH₂(Y.CH₂.CH₂)ₙ— where $n$ is 1 and Y is oxygen and sulfur respectively. The corresponding compounds where $n$ is 2 are the esters of triethylene glycol or 2,2'-(ethylenedithio)diethanol with a monoesterified azodiformate, and also usable are the corresponding compounds where $n$ is 3, these being the esters of tetraethylene glycol and 2,2'-[thiobis(ethylenethio)] diethanol with a monoesterified azodiformate.

For ordinary use in gas-producing compositions, where copious evolution of gas is desired per gram of the composition, the bivalent radical —R³— preferably is an alkylene group having 2, 3, or 4 carbon atoms, illustrated by the ethylene, trimethylene (1,3-propylene), tetramethylene(1,4-butylene), oxydiethylene, and thiodiethylene radicals.

Considered equivalent to these diesters including two azobis(formyloxy) groups joined by an alkylene radical, for inclusion in the above-mentioned gas-producing compositions, are diesters which include at least three such azo units. These diesters are polyester condensates which may be visualized as the condensation products, having at least three azo units, of azodiformic acid and a glycol having 2–10 and preferably 2–4 carbon atoms. For the ethylene glycol ester group (—CH₂CH₂—) having 2 carbon atoms, the building block may be written as

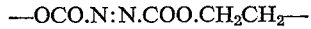
—OCO.N:N.COO.CH₂CH₂—

In the polyester product at least three units are present, the chain length advantageously having been determined in the polyester condensation by introducing into the reaction zone a chain stopper compound which provides a monofunctional ester group —R² such as methyl, ethyl, allyl, or 2-chloroethyl.

In the structural formula R¹.OCO.N:N.COO.R² for the diester, including diesters in which the radical —R¹ has the form (b) represented by R².OCO.N:N.COO.R³—, the radical —R² is selected from the group consisting of any of the radicals listed hereinabove in the subgroup (a). In the diesters containing only one azobis(formyloxy) group, where —R¹ also is selected from the group consisting of the aforesaid radicals (a), the diester more commonly is symmetrical, that is, the radical —R² is the same as the radical —R¹.

The symmetrical dialkyl azodiformates, in which the radicals —R¹ and —R² are the same alkyl radical, provide a particularly useful group of blowing agents. Among the lower dialkyl azodiformates the di-tert-butyl ester of azodiformic acid has the lowest decomposition temperature. Good blowing to obtain low density foams when mixed with polymeric materials may be obtained at 190° C. with nonactivated di-tert-butyl azodiformate. However, when used in accordance with the present invention, the presence of an activator, such as dibasic lead phosphite, 2PbO.PbHPO₃.½H₂O, gives equally profuse evolution of gas at a considerably lower temperature; indeed, with the more active activators, such as lead stearate or cadmium laurate, gas can be released by decomposition of the di-tert-butyl ester at temperatures well below 100° C.

As might be expected, gas evolution is a function of time as well as of composition and temperature. Examples of the effects of various activators, temperatures, and durations of blowing periods are discussed hereinbelow, where there appears a table showing amounts of gas evolved by various azodiformic acid esters with various activators, as well as without activators. This table includes several examples using dimethyl azodiformate, which has a decomposition temperature somewhat higher than the di-tert-butyl azodiformate when not associated with an activator. Thus dimethyl azodiformate, although stable at 150° C. without activation, provides abundant evolution of gas at 100° C. with the more active activators in a period of only 12 minutes. When associated with strong activators, it is possible to obtain some evolution of gas with the tert-butyl and methyl diesters at temperatures approaching ordinary room temperature.

Compared with the di-tert-butyl and dimethyl esters, the diisopropyl and di-sec-butyl esters of azodiformic acid have higher decomposition temperatures when pure. However, the latter diesters also may be used without activators in blowing compositions which can be blown at relatively high temperatures, as with polyethylene of high density (specific gravity above about 0.95) and with polypropylene, and in rotocasting vinyls. Nevertheless, the blowing temperatures of the isopropyl and sec-butyl diesters likewise are lowered, and the amounts of gas evolved tend to be increased, when they are used with an activator, so that the presence of an activator generally is highly desirable with these diesters. The diethyl, dipropyl (di-n-propyl), dibutyl, and diisobutyl esters of azodiformic acid are stable compounds, and they must be accompanied by activators to obtain desirably low blowing temperatures. Thus a highly useful category of diesters, which ordinarily should be associated with activators when used as blowing agents is contemplated, comprises the symmetrical diesters in which the radical —R¹ (and hence also the radical —R²) is an alkyl radical having from 2 to 12 carbon atoms of which the alpha-carbon atom, being the carbon atom adjacent to the carboxy (i.e., formyloxy) group, carries at least one hydrogen atom. This category does not include the dimethyl ester or the tertiary alkyl diesters, including the di-tert-butyl ester, since the dimethyl and di-tert-butyl esters have some utility without activators in certain applications. In this category the diethyl ester, as well as the diisopropyl and di-sec-butyl esters, have been found to be particularly attractive in the compositions of the invention.

Among the other diesters mentioned hereinabove, the bis-(2-chloroethyl), dicyclohexyl, and dibenzyl esters also are good examples of stable compounds which give good gas evolution when incorporated with activators in gas-producing compositions and heated to moderately elevated blowing temperatures. In general it may be observed that the diesters in which the radicals —R¹ and —R² are small groups tend to evolve more gas per gram of the diester at the blowing temperatures, as evidenced by the high production of gas observed with the activated compositions containing the diethyl, dimethyl, and diisopropyl esters. The diallyl ester, incidentally, evolves less gas and may be less desirable because of a tendency toward polymerization.

In these gas-producing compositions, the activator for promoting gas-releasing decomposition of the diester of azodiformic acid at elevated temperatures is present in the form of a metallic compound having unneutralized Lewis acid properties. The term "unneutralized" is taken to be synonymous with "not substantially completely neutralized." The activator should be present in an amount by weight equal to at least 1% of the weight of the gas-releasing material. In the preferred gas-producing compositions the activator is included in an amount by weight equal to between about 15% and 100% or more of the weight of the gas-releasing diester; larger amounts equal to as much as 150% or even 200% of the weight of the diester may be included advantageously for some purposes.

The metallic Lewis acid activators useful in conjunction with the azodiformic acid esters include any compound of a metal where the Lewis acid properties of the compound are not neutralized. By definition a Lewis acid is an electron pair (lone pair) acceptor and a Lewis base is an electron pair (lone pair) donor. All metals possess empty atomic orbitals that are at or very close to the energy levels of the atomic orbitals occupied by the so-called valence electron or electrons of the metal. It is well known that these empty atomic orbitals attract lone pair donors when the metal is present as a cation or when its valence electrons are involved in coordinate bonding, especially with groups or elements that are more electron-attracting than the metal. Thus compounds of virtually every metal in the several groups of the periodic system are Lewis acids and will activate the decomposition of the azodiformate esters, provided that their Lewis acid properties are not neutralized by the previous acceptance of lone pair donors that are impossible or very difficult to replace by an azo nitrogen lone pair.

One class of compounds wherein the Lewis acid properties of the metal are neutralized are the chelates. For instance, manganese acetyl-acetonate,

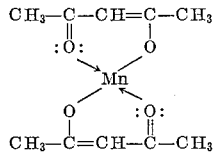

does not activate decomposition of diethyl azodiformate. The lone pair electrons of the carbonyl functions have been donated to two of the empty atomic orbitals of the manganese, as represented by arrows in the structural formula. Chromium acetylacetonate likewise does not activate the diethyl ester. In chelates the lone pairs are so firmly attached to the metal that the metal is essentially deactivated with respect to its Lewis acid properties, and consequently with respect to many of its catalytic properties. A widely used chelating agent is 8-quinolinol, which is known to form chelates with at least 50 different metals, representing about all of the more available metals except the alkali metals, which do not form chelates. Each of the alkali metals sodium, potassium, and lithium acts as a Lewis acid when salts of these metals are dissolved in water, wherein the cations become solvated by the electron-donating oxygen of the polar water molecules.

Ferrocene also falls into the category of neutralized Lewis acid compounds and, as expected, does not activate diethyl azodiformate.

Certain metallic phosphates and sulfates form another class of such metallic compounds whose Lewis acid properties are neutralized. Lead phosphate, for example, does not activate diethyl azodiformate, even though other lead compounds are among the most active activators for that azo ester. This presumably is due to the attraction of the empty orbitals of the lead for the lone pairs on phosphate oxygens in adjacent $\equiv P = \ddot{O}$: groups of the lead phosphate structure, as illustrated by:

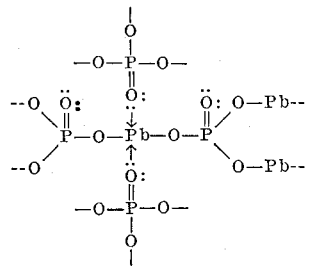

Thus the lead is essentially deactivated or neutralized as far as its Lewis acid properties are concerned in lead phosphate.

Metallic alkoxides are regarded classically as strong bases, and as such they should not be expected to activate the blowing of azo esters. Thus, titanium tetrabutoxide or butyl titanate, $(CH_3CH_2CH_2CH_2O)_4Ti$, does not activate diethyl azodiformate. The deactivation of the Lewis acid properties of the titanium probably results from resonating structures in which the lone pair electrons of the butoxy oxygens are being donated to the titanium through resonance, thus neutralizing the electron-accepting capability of the titanium. Such a resonance effect is accepted as explaining the fact that trimethyl borane, $(CH_3)_3B$, is a much stronger Lewis acid than trimethoxy borane, $B(OCH_3)_3$, even though the methoxy oxygen is more electronegative than a methyl group, which should result in an opposite effect if only an inductive effect were operating. Thus, it can be seen that metallic alkyls should act as activators even though these materials are classically considered as bases. This is because the alkyl anions (which are the actual bases) cannot feed any more electrons into the metal than the bonding electrons, since the resonance effects operative in the alkoxides are not present. To illustrate this point, dichlorodimethyltin, $(CH_3)_2SnCl_2$, and oxybis(tributyltin), $$(CH_3CH_2CH_2CH_2)_3SnOSn-(CH_2CH_2CH_2CH_3)_3,$$

were found to activate the decomposition of diethyl azodifomate.

Among the metallic compounds having generally unneutralized Lewis acid properties, and not otherwise unsuited for use as activators because of, for example, flammability, susceptibility to moisture, or instability, the most readily available and generally satisfactory activators have been found to be metallic compounds selected from the group consisting of metal salts of carboxylic acids and metal oxides. Notable among the carboxylic acid salts are metal salts of the fatty acids. The salts of formic acid are not recommended ordinarily, although operative as activators, because formic acid itself tends to disintegrate with evolution of gas. Metal salts of acetic acid are good activators, and salts of the higher fatty acids such as aluric acid, palmitic acid, and stearic acid make particularly good activators. Metal salts of 2-ethylhexanoic acid, commonly called octoic acid, frequently are preferred as activators, and salts of octanoic acid (caprylic acid) also are useful, as are such salts of other lower and higher fatty acids.

Metal salts of naphthenic acid also provide a ready supply of excellent activators. Naphthenic acid is a recognized carboxylic acid material, generally considered to be constituted by cycloparaffin acids derived from naphthene components, notably various cyclopentylalkanoic acids some of which have alkyl substituents on the cyclopentyl ring.

Oxides of metals, having unneutralized Lewis acid properties, constitute a prolific source of activators. Of course many other compounds with Lewis acid properties may serve as activators. For example, inorganic salts whose Lewis acid properties are not substantially completely neutralized, such as certain nitrates, carbonates, and chlorides, also conveniently may serve as activators.

Typical examples of compounds, mostly of the types mentioned hereinabove, considered particularly suitable for incorporation as activators in gas-producing compositions with azodiformate diesters include the following: lithium stearate, sodium acetate, sodium stearate, potassium acetate, potassium 2-ethylhexanoate (potassium octoate), cuprous oxide, cupric naphthenate, silver nitrate; magnesium palmitate, talc, calcium 2-ethylbutyrate, calcium 2-ethylhexanoate, calcium naphthenate, lime, calcium stearate, zinc 2-ethylhexanoate, zinc laurate, zinc naphthenate, zinc octanoate, zinc oxide, zinc stearate, strontium 2-ethylhexanoate, cadmium 2-ethylhexanoate, cadmium laurate, cadmium stearate, barium 2-ethylhexanoate, barium stearate, mercuric oxide, ceric sulfate; aluminum oxide, aluminum palmitate; activated silica gel, titanium dioxide, zirconium naphthenate, lead hexachlorosilicate, lead orthosilicate, lead 2-ethylhexanoate (lead octoate), lead monoxide, lead naphthenate, dibasic lead phosphite, dibasic lead phthalate, lead salicylate, lead stearate, dibasic lead stearate, tribasic lead sulfate, basic lead silicate sulfate; vanadium naphthenate, vanadium pentoxide, bismuth trichloride; chromium naphthenate; manganous naphthenate; and iron naphthenate, ferric oxide, iron distearate, cobaltous carbonate, and nickel naphthenate.

These typical examples will be seen to include numerous metal salts of fatty acids, metal salts of naphthenic acid, and metal oxides. Many of these same metallic compounds also are activators which are metal oxides or metal salts of carboxylic acids in which the metallic compound is a compound of a metal of group II of the periodic system, notably compounds of magnesium, calcium, strontium, barium, zinc, cadmium, and mercury. With these compounds also may be mentioned compounds of cerium, which is one of the lanthanide rare earth metals partaking of some of the characteristics of the alkaline earth metals of group II. Especially good activation has been obtained with activators comprising a plurality of metal salts of fatty acids, each of which is a salt of a different metal. A specific composition of this nature, made up primarily of 2-ethylhexanoic acid and 2-ethylbutyric acid salts of the group II metals barium, strontium, cadmium, zinc, and calcium, is mentioned hereinbelow, and similar compositions including a corresponding magnesium salt have given good results. The table appearing hereinbelow, showing amounts of gas evolved by various azodiformates with various activators, also shows the efficacy, as activators, of salts of one or more metals of group II in admixture with a potassium salt of a fatty acid. Particularly effective as activators are compounds of the metals of group IIB of the periodic system, being the metals zinc, cadmium, and mercury, having unneutralized Lewis acid properties. Activator compounds of the group IIB metals are included in a larger group, the members of which are related by atomic number and periodic group location in the periodic table, and which also is found among the typical examples given above. Thus, in this larger group, these examples include metallic compounds, having unneutralized Lewis acid properties, selected from the group consisting of such compounds of zinc, cadmium, mercury, tin, lead, titanium, vanadium, chromium, manganese, iron, cobalt, nickel, copper, and silver (examples of such tin compounds being found in the fourth paragraph hereinbelow), and further examples showing the effectiveness of activator compounds are given hereinbelow.

The modification of very active activator compounds by partially neutralizing the Lewis acid properties of the metal in the compounds, while still retaining substantial electron-accepting capability, in order to obtain activation of the decomposition of the azodiformic acid diesters but at relatively higher temperatures, is an important aspect of utilization of activators in the compositions and methods of this invention. Thus, whereas lead monoxide activates diethyl azodiformate in a dioctyl phthalate medium to evolve 235 ml./g. (measured under S.T.P., or standard temperature and pressure conditions) of gas when the activated diester is maintained at 165° C. for 12 minutes, dibasic lead phosphite, $2PbO.PbHPO_3$ (usually the hemihydrate), in dioctyl phthalate provides a relatively smaller evolution of 102 ml./g. (S.T.P.) of gas at 165° C. in 12 minutes. The phosphorus in the phosphite contains a lone pair which partially neutralizes the Lewis acid properties of the lead in this compound.

Lead salts of fatty acids and of naphthenic acid also provide good activation, and gas-producing compositions have been found generally desirable in which the activator is a lead compound having unneutralized Lewis acid properties, whether or not the Lewis acid properties may be partially neutralized.

Higher temperature activations also can be obtained by using deactivated metallic compounds that become activated at elevated temperatures, for example by removal of some water of hydration before blowing temperature is attained. Furthermore, mixtures of the more active activators with the less active activators can give various ranges of activation temperatures depending upon the compositions employed. For example, cadmium stearate is a strong activator, while barium stearate is a considerably weaker activator; a mixture of these two stearates gives activation of intermediate strength, resulting in dependable release of gas at a predetermined temperature without premature undesired release at a lower temperature.

It also has been found that certain relatively weak activators, notably tin salts of carboxylic acids, when present in admixture with certain other rather weak or moderately active activators, notably basic lead salts, produce synergistic effects in the activation of the azodiformate gas-releasing materials. Synergism is used here in the non-physiological sense, as applied to such activators which, when utilized conjointly, exhibit greater activating effect than the sum of their effects when utilized separately. These synergistic effects permit even greater flexibility in predetermining gas evolution temperatures. Among the lead compounds which might be used in such a synergistic mixture is dibasic lead stearate, but it is such a strong activator by itself that the use of a synergistic mixture tends to be more beneficial when one component of the mixture is a basic lead salt selected preferably from the group consisting of dibasic lead phosphite, dibasic lead phthalate, $2PbO.C_6H_4(COO)_2Pb$, and tribasic lead sulfate, $3PbO.PbSO_4$. Among the tin compounds which might be included in the mixture is dioctyltin oxide, but preferably there is included, in admixture with the basic lead salt, a tin salt of a carboxylic acid selected from the group consisting of stannous 2-ethylhexanoate and stannous stearate. Other tin salts which may be used as activators by themselves or in admixture with lead compounds are dibutyltin dilaurate, monobutyltin tris(2-ethylhexanoate), dibutyltin distearate, and dibutyltin maleate.

As examples of these synergistic effects, dibasic lead phosphite alone activates diisopropyl azodiformate to evolve 102 ml. (S.T.P.) of gas per gram of the azo ester at 200° C. in 12 minutes, while stannous stearate alone gives only 3 ml./g. from the same azo ester under the same time and temperature conditions. If, however, there is included an admixture of the same amounts (equal parts by weight) of the dibasic lead phosphite and the stannous stearate, the diisopropyl azodiformate gives 200 ml./g. after 12 minutes at a lower temperature of 180° C. Likewise, dibasic lead phthalate alone produces 195 ml. of gas per gram of diisopropyl azodiformate after 12 minutes at 200° C., whereas a 1:1 mixture of dibasic lead phthalate and stannous stearate produces 230 ml./g. after 12 minutes at only 150° C. Similar synergistic effects have been observed also with other stannous fatty acid salts and other lead compounds, as indicated hereinabove.

Moreover, certain of the above synergistic mixtures such as the dibasic lead phthalate-stannous stearate combination can be made even more active by aging a paste of such a combination in a suitable plasticizer such as dioctyl phthalate. For example, 50 weight percent of a freshly prepared paste of a 3:1 combination of dibasic lead phthalate:stannous stearate in dioctyl phthalate gives 152 ml. of gas per gram of diisopropyl ozodiformate after 12 minutes at 180° C. After aging for one week the same paste gives 244 ml./g. under the same time and temperature conditions. Tribasic lead sulfate and stannous octoate also show such an aging effect. Thus, whereas a freshly prepared paste of a 3:1 combination of these materials in 50 weight percent dioctyl phthalate causes only 32 ml. of gas per gram of diisopropyl azo ester to be evolved in 12 minutes at 130° C., the same paste, after aging for one week, causes evolution of 236 ml./g. from the diisopropyl azo ester under the same time and temperature conditions.

In another embodiment of the invention, a composition for producing cellular bodies upon heating comprises a polymeric material exhibiting a fluidity-temperature characteristic permitting formation of cellular structure upon heating and consequent releasing of gas throughout the body of the material. The polymeric material in most cases constitutes a major proportion (more than half) by weight of the entire composition. The aforementioned heating and release of gas is the blowing operation, and it is important that such a composition for producing cellular bodies be capable of being kept at ordinary storage temperatures for long periods of time without decomposition of the gas-producing components of the composition. These gas-producing components are provided by inclusion, in minor proportion by weight of the composition except in extraordinary cases, of a material for releasing gas upon heating. This gas-releasing material is distributed throughout the composition in the form of a diester of azodiformic acid represented by the structural formula $R^1.OCO.N:N.COO.R^2$, wherein the radical $—R^1$ is selected from the radical groups (a) and (b) as defined hereinabove, and wherein the radical $—R^2$ is selected from the group consisting of the above defined radicals (a). This gas-releasing material will be recognized as being selected from the same group of azo-diformates discussed hereinabove. To effectuate releasing of the desired quantities of gas at the desired range of blowing temperatures, the composition for producing cellular bodies comprises additionally, also in minor proportion by weight of the composition except in extraordinary cases, an activator for the gas-releasing diester material, this activator being distributed throughout the composition and taking the form of one of the metallic compounds, having unneutralized Lewis acid properties, of the types discussed hereinabove.

When one of these compositions for producing cellular bodies is heated to effectuate blowing, it will be appreciated that the fluidity and related characteristics, notably the coherence characteristic, of the composition must be such as to accommodate the gas evolved at the blowing temperature while retaining the cellular structure during the releasing of gas at that temperature. Those skilled in the art will be familiar with the properties and conditions necessary to retain cellular structure, whether the structure involves open cells or closed cells. The blowing may be carried out with the composition in thick masses or in thin sheets, and with the bodies of the composition to be blown either open to the surroundings or enclosed in molds or forms. During the blowing operation the composition may be kept under any suitable confinement or pressure, which may be much greater than atmospheric pressure or even less than atmospheric pressure. Using some compositions it is practicable to achieve gas-releasing decomposition of the blowing material by heating in a mold under such high pressure that the gas released cannot expand significantly; cooling the mold causes the thermoplastic body to harden and retain the unexpanded gas, so that the blowing expansion does not occur effectively until such time as the body is reheated. Such variations in the blowing operation are well known, and are great enough to permit utilization of a wide range of fluidity-temperature characteristics which are available in a wide variety of polymeric materials, having various molecular structures, degrees of polymerization, molecular weights, and associated plasticizers and other adjuvants when desirable, suitable for incorporation in the blowing compositions of the present invention.

The gas-producing compositions of azodiformate ester and activator accordingly are of value in the production of foamed polymeric bodies from any of numerous polymers, either thermoplastic or thermosetting. Illustrative polymers include: the polyolefins such as polyethylene, polypropylene, synthetic rubber and natural rubbers; the vinyl halides, such as polyvinyl chloride, and the copolymers such as vinyl chloride-vinyl acetate; the vinyl esters such as polyvinyl acetate; the cellulose esters, such as cellulose acetate and cellulose acetate butyrate; the cellulose ethers such as methyl cellulose; the silicone gums and rubbers; the nitrile rubbers; the polyesters, saturated or unsaturated aliphatic and aromatic; the polyethers; the polyamides; the polyurethanes; the phenolic resins; and the epoxy resins. As discussed hereinabove, any polymer may be foamed whose viscosity characteristics at the blowing temperature permit the expansion of the melt or the retention of the released gas.

COMPOSITIONS AND METHODS UTILIZING POLYOLEFINS

Polyolefin hydrocarbon materials have been found to be particularly advantageous for inclusion as the polymeric material in the compositions of the invention for producing cellular bodies upon heating. In selecting polyolefin hydrocarbon materials suitable for inclusion in specific blowing compositions, a wide variety of materials having various molecular weights and other characteristics is available. The following list indicates the broad choice of such materials available to the art: polyethylene; polypropylene or polypropene; ethylene-propylene rubber, being copolymers of ethylene and propene; ethylene-butylene rubber, being copolymers of monomeric ethylene and of one or more of the monomeric butenes 1-butene, 2-butene, and 2-methylpropene (isobutylene); terpolymer ethylene-propene rubbers which include also copolymeric 1,3-butadiene or cyclopentadiene; the polymers of conjugated diolefins such 1,3-butadiene, particularly the cis-polymer, and isoprene, as well as natural latex rubber; copolymers of 1,3-butadiene and the butylenes; and polystyrene and styrene-butadiene copolymers. As particularly suitable for inclusion in compositions for producing cellular bodies upon heating there may be mentioned a polyolefin hydrocarbon material in the form of a polyolefin hydrocarbon selected from the group consisting of polyethylene, polypropylene, copolymers of ethylene and propylene, and copolymers of ethylene and butylene.

Certain polyolefins contain some allylic-type carbon atoms. In the compositions for producing cellular bodies such polyolefins tend to shorten the shelf life, presumably due to saturation of the azo group in the diester of azodiformic acid, with linkages developing between one of the azo nitrogen atoms and an allylic carbon atom on the polyolefin chain. The uncured diene rubbers contain a considerable number of allylic hydrogen atoms, which may react with the azo ester on long standing and thereby decrease the amount of potentially available blowing gas. The presence of glycols appears to inhibit this type of undesired reaction.

In the method, embodying the invention, of making cellular bodies, a mixture is formed including a polymeric material advantageously in the form of a polyolefin hydrocarbon material, exhibiting a fluidity-temperature characteristic permitting formation of cellular structure upon release of gas throughout a body of the material at an elevated temperature; the desirable fluidity-temperature characteristics and related properties of the organoplastic material have been discussed hereinabove. The mixture advantageously is formed to include a major proportion by weight a polyolefin hydrocarbon selected from the group consisting of polyethylene, polypropylene, copolymers of ethylene and propylene, and copolymers of ethylene and butylene. A material for releasing gas upon heating is incorporated in the mixture, generally in minor proportions by weight, and a minor proportion of an activator for such gas-releasing material also is incorporated in the mixture. The gas-releasing material and the activator used in forming the mixture appropriately are chosen from the gas-releasing ester materials and from the activators therefor described and defined hereinabove.

For carrying out the heating with release of gas, a portion of the mixture so formed is chosen by disposing, arranging, or shaping a suitable quantity of the mixture as required to produce, during the blowing operation, a cellular body which ordinarily has a predetermined desired shape and size. It is understood, of course, that the actual blowing or gas-releasing step will change the size and often the shape of the portion of the mixture being used, due to the expansion of the cells with a corresponding decrease in average density. If no form or mold is used, as with sheet-like shapes or with masses of the mixture disposed for blowing or foaming in bulk, the thickness of the sheet or body increases during blowing, and, if a form is used, a portion of the mixture having a smaller volume than the mold expands more or less to fill the mold. When the mixture is heated in an extruder, the expansion may occur shortly after leaving the extruder die or orifice.

The chosen portion or portions of the mixture then is or are heated to effect gas-releasing decomposition of the gas-releasing material, which is the diester of azodiformic acid, at a rate of gas release determined by the presence of the activator under the elevated temperature conditions attained as a result of heating the mixture to blowing temperatures, the heating being carried out for expanding the aforesaid shaped portion of the mixture into a cellular body. The effect of the activator in determining the rate of evolution of gas at the desired blowing temperature is discussed hereinabove and will be illustrated further by examples set forth hereinbelow.

The amount of blowing agent employed in accordance with this invention will vary according to the type of product to be blown as well as the degree of blow desired. Products of decreasing densities are obtained using increasing amounts of blowing agent. The weight of blowing agent employed can vary from as low as 0.5 percent of the weight of the organoplastic in the manufacture of, say high density foamed polypropylene, or a high density cellular vinyl polymer, to as much as 50 weight percent of the organoplastic, depending upon the particular blowing agent, the amount of activator also provided, the particular polymeric material to be blown, the degree of blow, and the like.

*Example 1*

Exemplifying the above-described method embodying the invention, there is utilized a 200 gram sample of a general purpose extrusion polypropene (polypropylene) resin having a density of 0.915 g. ml. and a melt index of 0.5, in the form of ⅛ inch pellets. This is a polyolefin hydrocarbon material exhibiting a fluidity-temperature characteristic advantageously permitting formation of cellular structure upon release of gas throughout a body of the polypropene hydrocarbon at an elevated temperature above 170° C. A well mingled mixture then is formed including a major proportion, namely 200 grams, of this polypropene sample, with which is incorporated by tumbling a minor proportion, namely 1 gram, of liquid diethyl azodiformate which wets and coats the polypropene pellets uniformly.

There then is added with continued tumbling a minor proportion, also 1 gram, of an activator in the form of a mixture of carboxylic acid salts of group II metals, which further coats the wetted pellets uniformly. The activator mixture is prepared or obtained as a mixture of a plurality of metal salts of fatty acids, each of which is a salt of a different metal of group II, specifically barium, strontium, cadmium, calcium, and zinc. Such a material is used having the following approximate composition by weight:

| | |
|---|---|
| Barium 2-ethylhexanoate | 58 |
| Strontium 2-ethylhexanoate | 19 |
| Calcium 2-ethylbutyrate | 14 |
| Cadmium 2-ethylhexanoate | 6.5 |
| Zinc 2-ethylhexanoate | 2.5 |

This activator mixture has been found to be effective as an activator of intermediate strength, useful in effecting copious blowing of a diester of azodiformic acid at a temperature somewhat higher than the blowing temperature obtained with the strongest activators. The mixture of polypropene, diester, and activator constitutes a composition, embodying the invention, for producing cellular bodies upon heating, in which a gas-releasing material is the form of the diethyl ester of azodiformic acid, and an activator therefor in the form of a mixture of metallic compounds having unneutralized Lewis acid properties, specifically the above-listed salts of group II metals, are distributed throughout the composition containing the polypropene hydrocarbon in major proportion.

A portion of the mixture, formed by the tumbling operation into a polypropene composition for producing cellular bodies, is charged into a one inch extruder containing a 40, 80 and 10 mesh screen pack and having a 17:1 ratio of length to diameter. While in the extruder the mixture is confined within the extruder barrel, head, and die nozzle until the shaped potion is extruded from the die orifice. The mixture is heated to effect gas-releasing decomposition of the diethyl azodiformate therein, at a rapid rate determined by the presence of the activator therein, by heating the extruder barrel and head to maintain a temperature of 260° C. to cause softening and then melting of the polypropene mixture. Extrusion is carried out at a screw speed of 20 r.p.m. into a die which also is heated to maintain a temperature of about 260° C. The softened plastic mixture thus is heated in the extruder to effect gas-releasing decomposition of the diester of azodiformic acid, at a rate determined by the presence of the activator mixture at the elevated temperature of about 260° C. attained, for expanding the portion of the mixture shaped by the extruder die into a cellular body upon leaving the restraint imposed by the extruder and its die. The extruded foamed polypropene cellular bodies thus produced have a closed cell structure and a density of 0.464 g./ml. In the absence of the metallic fatty acid salts or other activator, no foaming occurs under the same extrusion conditions. Other diesters of azodiformic acid, such as the diisopropyl, di-sec-butyl, and dimethyl esters, may be substituted in the same proportions for the diethyl ester, using the same or a related activator with such suitable adjustments in extruder temperature and screw speed as will be evident to those skilled in the techniques of extrusion foaming, to produce similar low density, closed cell, foamed polypropene bodies.

In another modification of this method of making cellular bodies, the mixing is carried out first to obtain a quantity of pellets made up of the polyolefin hydrocarbon material, which again constitutes a major proportion by weight of the desired composition for producing cellular bodies upon heating, with the activator compound mixed into the pellets. For these pellets the aforementioned polypropylene material exhibits the specified fluidity-temperature characteristic, permitting formation of cellular structure upon heating, the heating effecting coalescence of the pellets at an elevated temperature above the softening temperature of the material, and also effecting release of gas throughout the body of the coalesced pellets through the above-described action of a diester blowing agent in the presence of the activator. The metallic gas-releasing-activator compound having unneutralized Lewis acid properties, constituting a minor proportion of the desired final composition, is present in homogeneous admixture with the polypropylene in the pellets. This homogeneous mixture is formed by heating the polypropylene to its fluxing temperature, in the range of 170°–220° C., and incorporating the mixture of metallic activator compounds into the softened polypropylene material in a Banbury mixer, or on a roll mill mixer or in an extruder. The homogenous mixture is colled and subdivided into pellets or pellet-like units, which preferably have major dimensions between about ¹⁄₁₆ and ⅛ inch. Conventional equipment for producing small fragments or pellets may be used, and the material from the Banbury mixer may be fed directly into the pelletizing apparatus; when an extruder is used, the rod-shaped extruded plastic containing the activator conveniently is chopped or sliced into pellets as it is extruded.

The pellets then are coated with one of the diester blowing agents in liquid or small particle form, preferably with a symmetrical diester of azodiformic acid represented by the structural formula

R.OCO.N:N.COO.R in which the radical —R is an alkyl radical having from 2 to 12 carbon atoms each of which carries at least one hydrogen atom. More particularly, the material for releasing gas upon heating is the liquid diethyl azodiformate, which is tumbled with the pellets so that the diester, constituting a minor proportion of the composition, is present as a coating on the pellets. This completes the mixing operation.

To form a cellular body, a shaped quantity of the pellets then is heated to the elevated temperature, conveniently in the extruder barrel as described hereinabove, to cause softening and coalescence of the pellets and to effect gas-releasing decomposition of the diester, as described, for expanding the shaped quantity of pellets, which have become coalesced and fused, into a cellular body upon leaving the extruder.

*Example 2*

The compositions and procedures discussed hereinabove under Example 1, utilizing the polypropylene hydrocarbon, may be used similarly with polyethylene as the organoplastic material. A 200 gram sample of polyethylene having a density of 0.924 g./ml. and a melt index of 3 is tumbled with 1.5 grams of diethyl azodiformate, then with 1.5 grams of perlite fines as a nucleating agent and supplementary activator, and then with 1 gram of the activator mixture, set forth above, of barium, strontium, cadmium, calcium, and zinc fatty acid salts to produce the blowing composition. This mixture is extruded as in Example 1, except that the extruder barrel and head temperature is maintained at 190° C. and a nozzle and die orifice temperature of about 210° C. is used.

Upon leaving the orifice, the blowing composition expands to give a foamed polyethylene of closed cell structure having a density decreased from 0.924 to 0.309 g./ml. In the absence of an activator such as the metallic fatty acid salts, however, no foaming occurs and the extruded product has a density substantially the same as that of the unblown polyethylene.

*Example 3*

The procedure of Example 2 is repeated, but 1.5 grams of diisopropyl azodiformate are used instead of the same weight of diethyl ester. The extruded foam has a density of 0.44 g./ml.

*Example 4*

The procedure of Example 2 is followed again, but using 1.5 grams of dimethyl azodiformate as the gas-releasing material. The extruded product has a foam density of 0.347 g./ml. If the same dimethyl ester is used without the activator mixture of metal fatty acid salts, considerably higher temperatures in the extruder barrel and die are required to obtain a similar foam.

*Example 5*

Following the procedure of Example 2, but using 2.0 grams of dimethyl azodiformate in place of the diethyl ester as the gas-releasing agent and 2.0 grams of zinc stearate in place of the activator mixture of metal fatty acid salts, an extruded foam is produced having the low density of 0.222 g./ml.

*Example 6*

The procedure of Example 2 is repeated with the use again of 1.5 grams of diethyl azodiformate as the gas-releasing material, but in this instance using 1.5 grams of zinc stearate in place of the activator mixture of metal fatty acid salts. A foam is produced having a fine and uniform cell structure and having a density of 0.623 g./ml.

*Example 7*

A finely dispersed mixture is formed of 50 grams of powdered polyethylene, having a density of 0.919 g./ml., 0.5 gram of an activator in the form of a lead compound having unneutralized Lewis acid properties, more particularly dibasic lead phosphate, 2PbO.PbHPO$_3$.1/2H$_2$O, and 1 gram of diethyl azodiformate. This composition is placed in a mold having the dimensions 4 x 4 x 1 inches and heated to maintain a temperature of 165° C. for 1.5 hours. The foamed, open-celled polyethylene body thus produced has a density of 0.188 g./ml. In the absence of the activator, however, no foaming occurs.

*Example 8*

A composition for producing cellular bodies upon heating is formulated as in Example 7, using 1 gram of diisopropyl azodiformate instead of the diethyl azodiformate. Upon placing in a mold and heating as in Example 7, a polyethylene foam is produced having a density of 0.238 g./ml.

*Example 9*

A composition is formulated as in Example 7, using 1 gram of di-sec-butyl azodiformate in place of the diethyl ester. Upon placing in a mold and heating as in Example 7, a foamed polyethylene body is produced having a density of 0.220 g./ml. No such cellular body is produced if the activator is omitted from this composition, since unactivated di-sec-butyl azodiformate must be heated to temperatures above about 200° C. to release any very effective amounts of gas in a 90 minute period, and even at about 250° C. less gas would be evolved than was evolved to cause the foaming in the example just given.

*Example 10*

The composition of Example 7 is used, but with 1 gram of dibutyl azodiformate substituted for the diethyl ester. Upon placing in a mold and heating as in Example 7, a foamed polyethylene body is produced having a density of 0.368 g./ml.

*Example 11*

The procedure of Example 7 is carried out again, but with 1 gram of diisobutyl azodiformate substituted for the diethyl ester. The open-celled polyethylene foam thus produced has a density of 0.260 g./ml.

*Example 12*

The procedure of Example 7 is carried out again, but with 1 gram of di-tert-butyl azodiformate substituted for the diethyl ester and with the heating time decreased from 90 to 45 minutes. The open-celled polyethylene foam thus produced has a density of 0.216 g./ml. If the dibasic lead phosphite is omitted, a heating time longer than 90 minutes is required in order to obtain a similar foam density.

*Example 13*

The procedure of Example 7 is repeated, including the use of 1 gram of diethyl azodiformate as the blowing material, but with 0.5 gram of lead monoxide replacing the dibasic lead phosphite as the activator, giving a foam density similar to that obtained with the latter.

*Example 14*

As the organoplastic material an ethylene-propylene rubber is used which is a copolymer made from 43% ethylene and 57% propene monomers by weight. 200 grams of such a copolymer (Enjay's EPR-404) are milled on a two roll rubber mill while maintaining a temperature of 38° C. After 6 minutes 100 grams of a petroleum carbon black (Continental Carbon Company's GPF 284) are introduced to the mill, and after milling has continued for a total time of 19 minutes 50 grams of mineral oil are added. At 20 minutes 6 grams are added of a cross-linking agent whose active ingredient is 50% by weight of (1,1,4,4-tetramethyl-2-butynylene)bis(tert-butyl peroxide), or 2,5 - dimethyl - 2,5 - di(tert-butylperoxy)-hexyne-3 (Wallace & Tiernan's Luperco 130–XL). At 22 minutes 5 grams of divinylbenzene are added. At 24 minutes 0.6 gram of sulfur is added, and the temperature of the ingredients being milled is permitted to drop to 30° C.

To provide the blowing materials, 8 grams of diethyl azodiformate are introduced to the mixture after 25 minutes of elapsed milling time, and 8 grams of the activator mixture of barium, cadmium, strontium, zinc, and calcium fatty acid salts used in Example 1 are added at 29 minutes. After a total of 34 minutes of milling, the sheet leaving the rolls is cut and removed from the mill.

For the foaming operation a 50 gram sample of the uncured sheet is cut into disks 2.25 inches in diameter and pressed in a No. 303 tin can, which serves as the foaming mold in this example. The can is placed in an oven preheated to 205° C., and a thermocouple is inserted into the uncured rubber formulation. The oven is closed, whereupon foaming commences, and curing occurs at the end of the forming operation. The hot blown specimen is removed and cooled to provide the foamed and cured sample of ethylene-propylene rubber. Using this unsophisticated laboratory technique, an expansion of 150% was obtained prior to curing, much greater than that obtained if no activator, such as the metallic fatty acid salts, is included in the blowing composition. Any of numerous other diesters of azodiformic acid may be used in place of the diethyl ester, as suggested and illustrated by various other examples set forth herein.

Example 15

In the above Example 14, an ethylene-butylene rubber of similar properties is substituted in equal weight for the ethylene-propylene copolymer, giving a blown specimen quite similar to that obtained in Example 14.

Example 16

The procedure of Example 14 is followed in preparing the composition for producing cellular bodies using the materials listed hereinbelow in the amounts specified:

| | Grams |
|---|---|
| 43–57 ethylene-propylene rubber | 90.0 |
| Carbon black (Pelletex SRF, Cabot Co.) | 36.0 |
| Sulfur | 0.3 |
| (1,1,4,4 - tetramethyl - 2 - butynylene)bis(tert-butyl peroxide) | 2.25 |
| Diethyl azodiformate | 3.0 |
| Lead phosphite-stearate, $PbO \cdot PbHPO_3 \cdot 1/2H_2O \cdot Pb(C_{17}H_{35}COO)_2$ | 3.0 |

After the milling, a 26.4 gram portion of the above composition is charged into a compression mold 3⅜ inches on a side and ⅜ inch high, and the mold is closed, placed in a press heated to 150° C., and subjected to a pressure providing a total load of 30 tons. After 20 minutes at 150° C. (press platen temperature) the pressure is released, and the hot blown specimen is removed from the mold and allowed to stand overnight at room temperature.

The density of the foamed and cured cellular body of ethylene-propylene rubber thus produced is 14 pounds per cubic foot, and the body has a fine and uniform cell structure. Without the lead activator compound, no foaming occurs. A similar unblown specimen has a density of 61 pounds per cubic foot.

Example 17

Pale crepe rubber from natural rubber latex is banded on a two roll mill and additional ingredients are supplied to the mill, thus formulating a composition for producing cellular bodies upon heating which utilizes the crepe rubber as the polyolefin hydrocarbon organoplastic material. The rubber is supplied and the other ingredients are added in accordance with the following listing and in the order given:

| | Grams |
|---|---|
| Pale crepe rubber | 200.0 |
| Titanium dioxide | 60.0 |
| Whiting | 60.0 |
| Zinc oxide | 10.0 |
| Sulfur | 6.0 |
| Mineral oil | 20.0 |
| Stearic acid | 20.0 |
| Zinc dimethyldithiocarbamate, $(N(CH_3)_2 \cdot C(S)S-)_2Zn$ | 0.44 |
| Bis(dimethylthiocarbamoyl) sulfide, $(N(CH_3)_2 \cdot CS-)_2S$ | 0.90 |
| Diethyl azodiformate | 2.10 |
| Mixture of barium, strontium, cadmium, calcium, and zinc fatty acid salts (from Example 1) | 1.05 |
| Perlite fines | 2.10 |

From the uncured sheet of this composition taken from the mill a 50 gram sample is cut into disks 2.25 inches in diameter and pressed in a No. 303 tin can, which serves as a foaming mold. The forming and curing of this rubber composition then is carried out in an oven as in Example 14. As the heating of the composition progresses in the oven, foaming commences when the stock reaches 110° C. and ceases at about 185° C., where the foamed rubber is cured. Even using this laboratory technique at the rather low temperatures reached, an expansion of 375% is obtained, indicating the great effectiveness of the activator mixture of fatty acid salts and of other materials serving as supplementary activators in this composition.

Example 18

Another composition is formulated using pale crepe rubber as in Example 17, except that the diethyl azodiformate is replaced by an equal weight of diisopropyl azodiformate. The foaming operation again is carried out much as in Examples 14 and 17, but the heating cycle is altered by placing the can or mold containing the unblown and uncured formulation in a cold oven, which then heated from room temperature to the curing temperature of about 180° C. Foaming commences when the stock temperature reaches 105° C. and ceases at 160° C. Using this procedure, an excellent expansion of 300% is achieved prior to curing, again indicating the effectiveness of the activating agents present in the composition.

Example 19

Another composition is formulated using crepe rubber as in Example 17, except that an equal weight of dimethyl azodiformate is used in place of the diethyl ester. This formulation is blown and cured in accordance with the procedure of Example 18. Foaming commences at about 113° C. and ceases at about 177° C. (stock temperature), somewhat below the temperature at which curing of this formulation is completed. An expansion of 450% is obtained prior to curing, showing that very effective evolution of gas occurs over the temperature range indicated when the dimethyl ester is used with suitable activator agents.

Example 20

The following butadiene-styrene rubber formulation is banded on a two roll mill, the ingredients being added in the order listed:

| | Grams |
|---|---|
| Butadiene-styrene rubber (Firestone FR-S) | 100.0 |
| Zinc oxide | 5.0 |
| Petrolatum | 3.0 |
| Stearic acid | 3.0 |
| Titanium dioxide | 20.0 |
| Kaolin mineral filler (Dixie Clay, Vanderbilt) | 60.0 |
| 2,2'-methylenebis(6-tert-butyl-4-methylphenol) | 1.0 |
| Zinc dimethyldithiocarbamate | 1.0 |
| Sulfur | 1.0 |
| Mineral oil | 20.0 |
| Diethylene glycol | 6.0 |
| Diisopropyl azodiformate | 3.0 |
| Lead stearate | 3.0 |

A mold 3⅜ inch on a side and ⅜ inch high is fully charged with the composition of the master batch milled as above, and the mold is placed under a pressure providing a load of 30 tons in a press preheated to 150° C. After 6 minutes in the press at this press platen temperature the pressure is released and the hot, blown specimen is placed in an air-circulating oven at 150° C. for 6 minutes, whereupon the body is cooled to room temperature.

The foamed butadiene-styrene rubber produced by this procedure constitutes a cellular body with a fine and uniform cell structure and a density of 28 pounds per cubic foot. Following the same procedure, but omitting the lead stearate from the rubber blowing composition, provides a body with a density of 50 pounds per cubic foot, indicating that the zinc oxide present has a rather small but substantial effect in inducing gas-releasing decomposition of the diisopropyl ester at temperatures not over 150° C., since omission of the diester blowing compound itself gives a body having a density of more than 60 pounds per cubic foot.

Example 21

The procedure of Example 20 is repeated, but with the omission of lead stearate as the principal activator compound. However, in its place an equal weight, 3.0 grams, of lead naphthenate is dissolved in the mineral oil prior to addition of the mineral oil to the composition being rolled and mixed in the mill. Again a foam is produced having a density of about 30 pounds per cubic foot.

Example 22

The procedure of Example 20 is repeated, using 3.0 grams of diethyl azodiformate in place of the diisopropyl ester and 3.0 grams of cadmium stearate in place of the lead stearate. The heating cycle is modified by preheating the press to 170° C., holding 10 minutes in the press at that platen temperature, and thereafter placing the specimen in the air-circulating oven at 180° C. for 15 minutes. The foamed butadiene-styrene rubber body has a fine and uniform cellular structure and a density of 26 pounds per cubic foot. Omitting the cadmium stearate, a density of the rubber body of 50 pounds per cubic foot again is obtained, due to the effect of the zinc oxide in activating decomposition of the diethyl ester.

Example 23

A gas-producing composition consisting essentially of one of the diesters of azodiformic acid defined hereinabove, and of an activator for promoting gas-releasing decomposition of this diester of azodiformic acid at elevated temperatures, is formed by tumbling and commingling equal weights of the diethyl ester of azodiformic acid and of cadmium stearate. The cadmium stearate is an activator in the form of a metallic compound having unneutralized Lewis acid properties and distributed throughout the gas-producing composition in an amount by weight equal to at least 1%, and more specifically 100%, of the weight of the diester utilized. The cadmium stearate is a metal salt of a carboxylic acid, specifically the fatty acid stearic acid, and also is a compound of a metal of group II of the periodic system, and more specifically a compound of a metal of group IIB of the periodic system.

The diethyl azodiformate-cadmium stearate gas-producing composition can be handled as a separate commodity until convenient to mix it with the rubber or other suitable polyolefin hydrocarbon in the desired proportions. Thus the procedure of Example 22 may be followed in preparing a butadiene-styrene rubber formulation until the formulation is ready for introduction of the diethyl azodiformate and cadmium stearate to the mill, at which time a 6 gram portion of the gas-producing composition, containing the desired 3.0 grams of diethyl azodiformate and 3.0 grams of cadmium stearate, is introduced to the mill to complete the formulation of the composition for producing cellular bodies upon heating, which contains butadiene-styrene rubber as the olefinic organoplastic material. Molding, heating in a press at 170° C., and completing the heating cycle in the oven at 180° C., as in Example 22, again produces a blown, cellular body having a density of less than 30 pounds per cubic foot.

Example 24

Example 20 is repeated, but this time a gas-producing composition is mixed in advance with equal weights of diisopropyl azodiformate and cadmium laurate. Six grams of this mixture are added to the two roll mill instead of the diisopropyl azodiformate and lead stearate added separately near the end of the mixing operation in Example 20. The molding procedure and heating cycle of Example 20 then is followed, giving a foam rubber having a density of 34 pounds per cubic foot and a fine, uniform cell structure.

COMPOSITIONS AND METHODS UTILIZING POLYVINYL HALIDES

Compositions for producing cellular bodies upon heating which comprise polymeric materials in the form of vinyl chloride polymeric materials also have been found to be particularly advantageous, and the use of vinyl chloride polymeric materials likewise is advantageous in methods, embodying the invention, of making cellular bodies. The term "vinyl chloride polymeric material," as used in this specification and in the appended claims, defines any organoplastic or polymeric material which includes, as an important constituent of its resinous molecular structure, the structural configuration obtained by polymerizing a halo-substituted, and usually chloro-substituted, vinyl monomer. The prototype of these vinyl chloride polymeric materials is polyvinyl chloride itself, which of course is available with a variety of molecular weights and viscosity-temperature characteristics, with or without pigments or other diluents, as well as with carriers or solvating agents, for example forming vinyl chloride plastisols, wherein the polyvinyl chloride ordinarily makes up more than half of the weight of the material. Polyvinylidene chloride likewise is a vinyl chloride polymeric material prepared from a chloro-substituted vinyl monomer. The term further will be seen to cover not only polymeric materials made by copolymerization of vinyl chloride and vinylidene chloride, but also copolymers of either of them with other monomers, such as vinyl chloride-vinyl acetate copolymers and vinylidene chloride-acrylonitrile copolymers, as well as mixtures with other organoplastic materials, for example a mixture of polyvinyl chloride and polyacrylonitrile. Chlorinated polyethylene has a polymeric carbon chain with a structural configuration very similar to the structures of polyvinyl chloride and polyvinylidene chloride, and this carbon chain has a closely related arrangement of chlorine substituents. Chlorinated polyethylene thus is considered for the purposes of the present invention to be a vinyl chloride polymeric material equivalent to polyvinyl chloride, as are, for example, mixtures of polyvinyl chloride and chlorinated polyethylene.

In accordance with a feature of the invention involving certain vinyl chloride polymeric materials, a composition for producing cellular bodies upon heating comprises polyvinyl chloride particles; a liquid plasticizer capable of solvating polyvinyl chloride at elevated temperature, the polyvinyl chloride being present in intimate mixture with this pasticizer and the polyvinyl chloride-plasticizer mixture likewise exhibiting a fluidity-temperature characteristic of the type mentioned above; a material for releasing gas upon heating, distributed throughout the composition in the form of the above-defined diester of azodiformic acid; and the activator specified above also distributed throughout the composition. In accordance with a related feature of the invention, a gas-releasing composition for polyvinyl chloride materials comprises a liquid plasticizer for solvating polyvinyl chloride at elevated temperature, and a material for releasing gas upon heating which is dissolved in this plasticizer in the form of the above-defined diester of azodiformic acid. In a modification of this related feature of the invention, an activator of the type specified above is admixed in finely divided form in the plasticizer of such a gas-releasing composition. Gas-releasing compositions of these types, for use with the polyvinyl chloride materials solvated by the liquid plasticizer in such compositions, constitute advantageously useful compositions of matter which conveniently may be packaged and distributed for use in effecting foaming of vinyl plastisols.

Referring again to the viscosity characteristics needed for foaming a polymeric material, it may be noted here that the requisite characteristics, within the wide range utilizable in various blowing systems, may be obtained with a variety of available vinyl chloride polymeric materials; the latter materials as is the case with other polymers such as the polyolefins discussed hereinabove, may have various molecular weights and other varied properties. The fluidity-temperature characteristic of the polymeric material may be modified markedly by the presence of an organic liquid vehicle, as in the vinyl organosols. The solvating liquids in vinyl plastisols often cause the materials to exhibit complicated changes in fluidity during heating. The unsolvated resin in the plastisol tends to soften as the temperature first rises, with increase in fluidity of the mass, followed by a tendency to stiffen or gel upon further heating, as solvent action commences, then to become gradually more fluid again at still somewhat higher temperatures, until the plasticizer essentially has dissolved the resin to form a single phase system. This latter phenomenon generally is referred to as occurring at the fusion (or curing) point or temperature. The second increase of fluidity, prior to or even after fusion, may be the point in the fluidity-temperature characteristic most suitable for the blowing or foaming in certain cases, while the initial increased fluidity point just prior to the gel point may be most suitable for foaming other formulations. The provision of blowing agents which can be chosen to evolve gas promptly and efficiently at the most suitable temperature is an important aspect of the present invention.

In the compositions for producing cellular bodies upon heating which contain vinyl chloride polymeric material, that material generally is included in major proportion by weight. Large proportions of an organic liquid medium may be included in such compositions which utilize vinyl organosols or plastisols, but in those compositions the vinyl resin solids and the organic liquid or plasticizer together make up considerably more than half of the total weight, although the resin solids (if considered alone) may constitute substantially less than half of the total weight of the composition. Again, except in extraordinary cases, the gas-releasing material incorporated in these various compositions amounts to a minor proportion by weight of the composition, and likewise the activator ordinarily is used in amounts making up a minor proportion of the total weight.

*Example 25*

In carrying out a method, embodying the invention, of making cellular bodies utilizing a vinyl chloride polymeric material in a mold under pressure, there first is formed a mixture including such a polymeric material which consists essentially of polyvinyl chloride but which includes also an organic vehicle. Thus polyvinyl chloride particles advantageously are present in intimated mixture with a liquid plasticizer capable of solvating polyvinyl chloride at elevated temperature. More specifically, the mixture is formed to include as the vinyl chloride polymeric material a polyvinyl chloride plastisol exhibiting, either before or after fusion or curing, a fluidity-temperature characteristic permitting formation of cellular structure upon release of gas throughout a body of the material at an elevated temperature. Using a sealed mold, as described hereinbelow, the temperature may be raised considerably above the gel point of the plastisol (about 85° C. in this instance), and in this example gas evolution occurs as the mold is heated to about 180–195° C. The gas evolved tends to be dissolved by the organoplastic. After cooling and removing from the mold, the slightly expanded specimen can be reheated to a lower temperature to soften the material, allowing the complete expansion to occur. It will be understood that this two step procedure for decomposing the blowing material to release the gas while under confinement, and for subsequent reheating to complete the expansion, illustrates one mechanism permitting formation of cellular structure upon release of gas at an elevated temperature.

In laboratory-scale tests the plastisol dispersion is compounded by placing 33.9 grams of dioctyl phthalate, bis(2-ethylhexyl) phthalate, which is a liquid plasticizer capable of solvating polyvinyl chloride at an elevated temperature, in a high speed, paddle type blender and by adding stepwise 33.9 grams of a dispersion grade, low-fushion type polyvinyl chloride (Diamond Alkali #7402). The polyvinyl chloride particles then are present in intimate mixture with the plasticizer, and the mixture forms a plastisol which exhibits the aforementioned fluidity-temperature characteristic. Also advantageously included with the dioctyl phthalate is an epoxy plasticizer (Rhom & Haas G62), 1.7 grams, and a synthetic calcium sulfonate dispersing agent (Conoco "Demivis"), 0.7 gram.

There is incorporated in the resulting plastisol dispersion mixture a material for releasing gas upon heating, in the form of diethyl azodiformate or of another one of the azodiformate blowing agents identified specifically hereinbelow, which is added to the mixture in the blender, in an amount stated hereinbelow, as a liquid or as a finely divided solid, as the case may be. Also incorporated in the mixture is an activator for the gas-releasing material, in the form of a metallic compound, and more specifically a lead compound, having unneutralized Lewis acid properties. For this purpose a disbasic lead phosphite powder, $2PbO \cdot PbHPO_3 \cdot 1/2H_2O$, is placed in the blender in the amount of 1.7 grams. The resulting mixture constitutes a composition, embodying the invention, for producing cellular bodies upon heating, which comprises the above-described polyvinyl chloride plastisol material, along with the azodiformate gas-releasing material and its activator, both distributed throughout the composition.

A portion of such a plastisol mixture, in this case all of the mixture formed in the amounts mentioned, is placed in a compression mold 3⅜ inches on a side and ⅜ inch high. The mold is closed, using aluminum gaskets, and subjected to a pressure providing a total load of 24,000 pounds. The mixture is heated by raising the mold temperature initially to 180° C. in 12 minutes and maintaining this temperature for 5 minutes, thus effecting gas-releasing decomposition of the blowing compound at a rate of gas release determined by the presence of the lead compound at elevated temperatures approaching 180° C., after which the mold is allowed to cool to a temperature below 60° C. in 10 minutes. This specimen then is removed from the mold and placed in an oven for one hour at 100° C. to complete the expansion cycle.

The expanded specimen is cooled and its density measured to determine the expansion power of the blowing agent. When the blowing agent is the diethyl ester of azodiformic acid, the density of the plastisol composition is decreased by this blowing operation from 62.2 to 14.5 pounds per cubic foot.

In variations of this example, other blowing agents are used instead of the diethyl azodiformate, and the density similarly is measured to determine the expansion power under comparable conditions, which are not necessarily the ideal blowing conditions for each of the compositions. The following list, Table I, summarizes the results obtained in these tests using various diesters of azodiformic acid as the gas-releasing or blowing material with the dibasic lead phosphite as the activator. A test made with no blowing agent is included for comparison.

TABLE I

| Blowing Material | Weight Incorporated, g. | Initial Mold Temp., °C. | Foam Density, lb./cu. ft. |
| --- | --- | --- | --- |
| None | 0.0 | 180 | 62.2 |
| Diethyl azodiformate | 1.7 | 180 | 14.5 |
| Diisopropyl azodiformate | 1.7 | 180 | 18.1 |
| Dibutyl azodiformate | 1.7 | 180 | 18.5 |
| Diisobutyl azodiformate | 1.7 | 180 | 19.9 |
| Di-sec-butyl azodiformate | 1.7 | 180 | 21.4 |
| Di-tert-butyl azodiformate | 1.7 | 180 | 15.4 |
| Bis(2-chloroethyl) azodiformate | 1.7 | 180 | 19.8 |
| Dicyclohexyl azodiformate | 1.7 | 180 | 21.6 |
| Dibenzyl azodiformate | 1.5 | 180 | 24.1 |
| In the following two tests, the mold load was increased to 40,000 lbs.: | | | |
| Dimethyl azodiformate | 2.0 | 195 | 9.3 |
| Diethylene bis(monoethyl azodiformate) | 4.0 | 195 | 6.0 |

In a modification of Example 25, there first is made a gas-releasing composition for polyvinyl chloride materials, which consists essentially of a liquid plasticizer capable of solvating polyvinyl chloride at elevated temperature, and of a material for releasing gas upon heating which is dissolved in the plasticizer. The bis(2-ethylhexyl) phthalate is used as the preferred plasticizer, but other plasticizers such as di-n-octyl phthalate and tritolyl phosphate may be used with good results. The gas-releasing material, which advantageously is the diethyl azodiformate, is dissolved in the plasticizer in an amount equal to between 10% and 90% by weight of the resulting solution. A 50% to 70% azodiformate solution by weight is preferred, and in this example equal weights are used to obtain a 50% solution.

This gas-releasing composition may be prepared, packaged, marketed, and stored as a separate commodity until convenient to use it in carrying out the method of making cellular bodies. Thus the composition prepared as in Example 25 may be formulated using 32.2 grams of the dioctyl phthalate, 33.9 grams of dispersion grade polyvinyl chloride, 1.7 grams of the epoxy plasticizer, and 0.7 gram of the dispersing agent. When 3.4 grams of the 50% gas-releasing composition, supplying 1.7 grams of additional dioctyl phthalate and 1.7 grams of diethyl azodiformate, plus 1.7 grams of the dibasic lead phosphite activator are mixed into the polyvinyl chloride plastisol already formulated, a blowing formulation having the same composition is obtained.

Alternatively, a gas-releasing composition made up of equal weights of the plasticizer, the gas-releasing material, and an activator for the gas-releasing material may be prepared by admixing the required amount of the lead phosphite with the dioctyl phthalate-diethyl azodiformate solution. This gives a gas-releasing composition for polyvinyl chloride materials, containing the activator in suspension, which likewise may be packaged, marketed, and stored as a separate commodity. This gas-releasing composition subsequently is well agitated and 5.1 grams thereof are mixed into the formulation containing 32.2 grams dioctyl phthalate, 33.9 grams of polyvinyl chloride, 1.7 grams of the epoxy plasticizer, and 0.7 gram of the dispersing agent. Again there is obtained a blowing formulation constituting the same composition of Example 25 for producing cellular bodies.

*Example 26*

As in Example 25, a plastisol is provided of polyvinyl chloride particles and a plasticizer capable of solvating the polyvinyl chloride particles at elevated temperature. For this purpose 100 grams of the same dispersion grade polyvinyl chloride are milled on a three roll mill with 90 grams of a plasticizer in the form of a terminated polyester of adipic acid and a mixture of glycols of low molecular weights. The polymeric plasticizer used for the plastisol itself had an average molecular weight of 1,500 to 1,600, a specific gravity of 1.096 at 25/25° C., and approximate viscosities in centistokes of 3,000 at 25° C., 1,400 at 38° C., and 120 at 99° C. While the plastisol is on the mill a material for releasing gas upon heating is intimately mixed into the plastisol, the gas-releasing material being 4 grams of the liquid dimethyl ester of azodiformic acid. This plastisol exhibits a fluidity-temperature characteristic permitting formation of cellular structure upon release of gas throughout a body of the plastisol at a moderately elevated temperature as low as 75° C. Finely divided particles of an activator for the gas-releasing material are dispersed in the plasticizer by also introducing to the mill 4 grams of lead stearate. Lead stearate is one of the activators preferred for use in the compositions of the invention for producing cellular bodies upon heating, since lead stearate is a metal salt of a carboxylic acid, specifically a fatty acid, and also is a lead compound having unneutralized Lewis acid properties.

A portion of the resulting mixture, containing the gas-releasing material and the activator particles, is poured on a ferrous plate, without deaerating, and heated by placing the plate for 10 minutes in an oven preheated to 75° C. to effect gas-releasing decomposition of the dimethyl azodiformate gas-releasing material at a rate of gas release determined by the presence of the lead stearate activator under the elevated temperature conditions attained in the oven, thus expanding the portion of the mixture on the plate into a blown, cellular body. The blown sample then is placed for 1 minute in an oven preheated to 180° C. and finally is cooled slowly to room temperature.

The resultant foam has a density of 21 pounds per cubic foot with a fine and uniform cell structure. The density of a similar fused but unblown plastisol is 75 pounds per cubic foot. When the lead stearate in the composition made in accordance with Example 26 is replaced with 1-phenyl-2-thiourea, a polyvinyl chloride stabilizer which does not activate the gas-releasing decomposition of esters of azodiformic acid, no foaming occurs. When the lead stearate is replaced by 2,6-di-tert-butyl-p-cresol, a polyvinyl chloride antioxidant which likewise is not an activator, again no foaming occurs.

When, however, a similar formulation is prepared on the three roll mill, using 3 grams instead of 4 grams of dimethyl azodiformate and 2 grams of dibasic lead phosphite $2PbO \cdot PbHPO_3 \cdot 1/2H_2O$, as well as the lead stearate, followed by casting on a plate and then heating at 85° C.

for 10 minutes and at 190° C. for 1 minute, excellent blowing occurs, resulting in a foam density of 18 pounds per cubic foot.

*Example 27*

A well dispersed plastisol is formulated by milling on a three roll mill 100 grams of a dispersion grade polyvinyl chloride having a specific viscosity of about 0.60 Geon 121, B. F. Goodrich), 100 grams of the polymeric plasticizer used in Example 26, 1 gram of lead stearate, 1 gram of dibasic lead phosphite $$(2PbO \cdot PbHPO_3 \cdot 1/2H_2O)$$

and 2 grams (2 parts per hundred) of diethyl azodiformate. The plastisol is deaerated under vacuum and poured on a ferrous plate, which is placed for 10 minutes in an oven preheated to 100° C. The blown sample then is placed for 2 minutes in an oven preheated to 180° C. to cure the specimen, followed by slow cooling to room temperature.

Measurement of the foam density of this specimen gives a value of 21.0 pounds per cubic foot, compared with 79.5 pounds per cubic foot measured with an unblown specimen obtained by following the same procedure but without including any azodiformate in the plastisol. When, however, the same procedure is followed using 6 grams (6 parts per hundred) instead of 2 grams of diethyl azodiformate, measurement of the foam density gives a value of 10.0 pounds per cubic foot. Whether 2 or 6 parts per hundred of the diester are used, it is interesting to note that the foam density as measured corresponds to 326 ml. of gas in the foamed bodies, computed at standard temperature and pressure (S.T.P.), per gram of the diester used.

*Example 28*

Well dispersed plastisols are formulated by milling on a three roll mill 100 grams of a dispersion grade polyvinyl chloride having a specific viscosity of 0.23 (Bakelite QYKV, Union Carbide), 100 grams of bis(2-ethylhexyl) phthalate as plasticizer, and minor proportions of a dialkyl azodiformate and of an activator or activator mixture in the amounts indicated in Table II. With the aid of a doctor blade, films 0.040 inch thick of each of the plastisol formulations are cast on a flat plate, using glass plates or ferrous plates as convenient. Each plate is placed separately in a preheated oven to foam the plastisol, following a heating schedule also indicated in Table II. As indicated, some of these plastisol formulations are blown at one temperature and fused or cured at a higher temperature, while the foaming and curing of other formulations are carried out at a single oven temperature. The blown films are cooled, and the expansion caused by the blowing is determined as a measure of the foam density. The experimental data for runs 4A–4I (which may be identified also herein for convenience as Examples 28A–28I respectively) are listed in Table II. For purposes of comparison the amounts of diester and of each activator component are given in parts per hundred (p.p.h.) by weight, relative to the weight of the resin, as in Example 27. In the present example the weights shown in Table II are equal to the weights of the components in grams. Each activator used is a metal salt of bis(2-ethylhexanoic) acid (octoic acid), or a mixture of such octoate salts, and Table II gives only the metal or metals in each salt listed.

TABLE II

| Run No. | Dialkyl Ester Used | Dialkyl Ester, p.p.h. | Octoate Activator Used | Activator, p.p.h. | Heating Schedule | | Foaming Expansion, percent |
|---|---|---|---|---|---|---|---|
| | | | | | Temp., °C. | Time, min. | |
| 4A | Diethyl | 8 | Cadium salt | 0.3 | 170 | 10 | 600 |
| | | | Zinc salt | 0.5 | | | |
| | | | Potassium salt | 0.6 | | | |
| 4B | do | 4 | Lead salt | 1.3 | 170 | 20 | 575 |
| 4C | do | 5 | Zinc salt | 1.1 | 175 | 15 | 300 |
| | | | Potassium salt | 0.8 | | | |
| 4D | Di-n-butyl | 8 | Cadium salt | 0.6 | 180 | 20 | 450 |
| | | | Zinc salt | 1.0 | | | |
| | | | Potassium salt | 1.2 | | | |
| 4E | do | 4 | Cadium salt | 0.3 | 180 | 20 | 350 |
| | | | Zinc salt | 0.5 | | | |
| | | | Potassium salt | 0.6 | | | |
| 4F | Dimethyl | 2 | Cadium salt | 0.2 | 130 | 5 | 300 |
| | | | Zinc salt | 0.3 | 175 | 10 | |
| | | | Potassium salt | 0.3 | | | |
| 4G | do | 2 | Lead salt | 0.7 | 130 | 15 | 250 |
| | | | | | 175 | 10 | |
| 4H | do | 2 | Zinc salt | 0.4 | 130 | 15 | 150 |
| | | | Potassium salt | 0.3 | 175 | 10 | |
| 4I | Diisopropyl | 4 | Cadium salt | 0.9 | 170 | 30 | 337 |
| | | | Zinc salt | 1.5 | | | |
| | | | Potassium salt | 1.9 | | | |

*Example 29*

The plastisol in this example utilized a vinyl chloride polymeric material in the form of a dispersion grade copolymer of vinyl chloride and vinyl acetate monomers in which the monomeric units of vinyl chloride predominate; the copolymer has a low fusion point and a specific viscosity of 1.4. To 100 grams of this copolymeric resin are added on a three roll mill 50 grams of bis(2-ethylhexyl) phthalate and 50 grams of benzyl butyl phthalate as plasticizers, 1 gram of dimethyl azodiformate, and 1 gram of a metal oxide having unneutralized Lewis acid properties, in the form of powdered lead monoxide. The resulting well dispersed plastisol is deaerated under vacuum, poured on a ferrous plate, and placed for 10 minutes in an oven preheated to 165° C. to blow and fuse the plastisol. The foam produced by this procedure has a density of 18.4 pounds per cubic foot, while the density of a similar unblown sample is 77 pounds per cubic foot.

*Example 30*

Again 100 grams of the copolymeric resin used in Example 29 are milled on a three roll mill, this time with 80 grams of the polymeric plasticizer used in Example 26, 4 grams of lead stearate, being both a metal salt of a fatty acid and a lead compound, as an activator, and 2 grams of dimethyl azodiformate as the gas-releasing material whose decomposition is activated by the lead stearate. The resulting plastisol is poured on a ferrous plate and placed in an oven at 80° C. for 6 minutes and then in an oven at 160° C. for 2 minutes. The vigorous blowing action obtained with the dimethyl ester at a temperature below 100° C., as a result of the presence of lead stearate in an amount equal to 200% of the weight of the diester, causes the unblown density for the fused product of 71.5 to decrease to 21 pounds per cubic foot for the resultant foam.

Examples 29 and 30 illustrate the inclusion of vinyl chloride polymeric materials in which the resinous molecular structure includes components derived not only from vinyl chloride but also, as by copolymerization, from other monomeric sources, in these examples from vinyl acetate. As mentioned hereinabove, resinous molecular structures of configurations suitable for the organoplastic material also may be obtained in polyvinylidene chloride and in various other copolymers and mixtures based in general or polyvinyl chloride, polyvinylidene chloride, and chlorinated polyethylene. Thus other organoplastic materials having such closely related molecular structures may be substituted in generally similar amounts for the copolymer included in Examples 29 and 30 or for the polyvinyl chloride material in the other examples herein. It will be appreciated from the discussion hereinabove that the optimum blowing conditions may be determined as much by the pressure of a vehicle or solvent-type plasticizer as by the nature of the particular vinyl resin material utilized. In a preferred form of the invention the resin is present as a plastisol having a weight of plasticizer equal to the weight of the resin multiplied by a factor of between roughly 0.6 and 1.25. If, when a different vinyl chloride polymeric material or plasticizer is substituted, the temperature-fluidity characteristic of the system should make it desirable to change the temperature at which blowing occurs, suitable variations in the gas-releasing material and activator are indicated to those skilled in the art by the examples herein and by Table III hereinbelow, which shows amounts of gas evolved and temperature of gas evolution obtained with various gas-releasing materials and activators.

*Example 31*

The following formulation is milled on a three roll mill to obtain a well dispersed plastisol:

| | Grams |
|---|---|
| Polyvinyl chloride, dispersion grade (Marvinol VR51, U.S. Rubber) | 100 |
| Bis(2-ethylhexyl) phthalate | 120 |
| Lead stearate | 2 |
| Diethyl azodiformate | 2 |

A film of this plastisol 0.050 inch thick is cast on a glass plate, placed for 20 minutes in an oven preheated to 150° C., and then placed for 3 minutes in an oven preheated to 180° C. The resultant blown film has a density of 17 pounds per cubic foot. A similar unblown sample has a density of 77 pounds per cubic foot.

*Example 32*

The following formulation is milled:

| | Grams |
|---|---|
| Polyvinyl chloride, dispersion grade (Bakelite QYKV) | 100 |
| Plasticizer | 80 |
| Lead stearate | 4 |
| Diethyl azodiformate | 2 |

The plasticizer in this formulation is primarily the polymeric plasticizer used in Example 26, but includes 5 grams of dihexyl sebacate as an auxiliary plasticizer. A thin film is cast as in Example 31. Upon blowing in an oven at 90° C. for 10 minutes and fusing in an oven at 185° C. for 5 minutes, a body of polyvinyl chloride foam is obtained having a density of 16 pounds per cubic foot. A similar unblown body has a density of 67.5 pounds per cubic foot.

*Example 33*

The following formulation is milled:

| | Grams |
|---|---|
| Polyvinyl chloride, dispersion grade (Geon 120X174, B.F. Goodrich) | 100 |
| Polymeric plasticizer (same as in Example 26) | 100 |
| Dibasic lead phosphite, $2PbO.PbHPO_3.1/2H_2O$ | 1.0 |
| Lead stearate | 1.0 |
| Diethyl azodiformate | 1.5 |

A film is cast from the well dispersed formulation, as in Example 31. Upon blowing in an oven at 100° C. for 10 minutes and fusing in an oven at 180° C. for 2 minutes, a vinyl foam body is obtained having a density decreased from 71.5 to 19 pounds per cubic foot.

*Example 34*

The following formulation is milled:

| | Grams |
|---|---|
| Polyvinyl chloride, dispersion grade (Diamond Alkali #7402) | 100 |
| Bis(2-ethylhexyl) phthalate | 50 |
| Benzyl butyl phthalate | 50 |
| dimethyl azodiformate | 1 |
| Cadmium laurate | 1 |

The cadmium laurate activator is, of course, a metal salt of a carboxylic acid, more specifically a fatty acid salt, as well as a compound of a metal of Group II of the periodic system, and more specifically of Group IIB, having advantageous activator properties and having, along with other metal salts of fatty acids, unneutralized Lewis acid properties. A film of the well dispersed vinyl plastisol formulation is cast, as in Example 31, and the ferro plate carrying the film is foamed and cured by placing for 10 minutes in an oven at 150° C. The density of the resulting body is decreased by the foaming from 77 to 22.7 pounds per cubic foot.

*Example 35*

A mixture including polyvinyl chloride in major proportion by weight, with which is incorporated a gas-releasing material and an activator therefor, each in minor proportion, is formed by powder-mixing at about 80° C. 100 grams of a general purpose polyvinyl chloride resin (Geon 103EP, B. F. Goodrich) with a solution of 0.5 gram of diisopropyl azodiformate in 65 grams of bis(2-ethylhexyl) phthalate. As the activator for the isopropyl diester 2 grams of a powdered lead phosphite-stearate having the apparent formula $$PbO.PbHPO_3.1/2H_2O.Pb(C_{17}H_{35}COO)_2$$

are included with the materials being mixed.

A portion of a mixture having the materials and proportions just given is shaped by charging into a one inch extruder. This extruder contains a 60 and 40 mesh screen pack and has a 17:1 ratio of length to diameter. Thus the mixture is confined within the extruder barrel and die until extruded from the die through operation of the extruder at a screw speed of 20 r.p.m. The extruder barrel and die are heated to cause softening of the mixture and to effect gas-releasing decomposition of the isopropyl diester of azodiformic acid, at a rate of gas release determined by the presence of the lead phosphite-stearate activator under the elevated temperature conditions attained by the shaped portion of the mixture, for expanding such portion, upon leaving the extruder die, into a cellular body. For this purpose the extruder is heated to maintain the barrel temperature at 185° C., the head temperature at 178° C., and the die temperature at 160° C.

The extruded, elongated, foamed polyvinyl chloride body thus obtained, after passing a die opening ¼ inch by ¹⁄₃₂ inch, expands so as to more than double the width and thickness dimensions within which it is constrained by the die. When, however, an equal weight of a non-activating polyvinyl chloride stabilizer, 1-phenyl-2-thiourea, is substituted for the lead phosphite-stearate during the mixing operation, no foaming occurs during or after the extrusion operation.

Example 36

The following formulation is milled on a three roll mill:

| | Grams |
|---|---|
| Polyvinyl chloride, dispersion grade (Diamond Alkali #7402) | 100 |
| Bis(2-ethylhexyl) phthalate | 70 |
| Epoxy ester plasticizer (Rohm & Haas G–62) | 20 |
| Diisopropyl azodiformate | 2 |
| Mixture of fatty acid salts | 2 |

The activator mixture is prepared or obtained as a mixture of a plurality of Group II metal salts of fatty acids, being the same mixture of salts identified hereinabove as the activator mixture in Example 1.

The plastisol formulated on the mill is used to fill a square mold 3⅜ inches on a side and ⅜ inch high. The mold is placed in a press preheated to 180° C., using a pressure giving a total load of 30 tons on the mold. Aluminum foil is used as a gasket material for the mold cover. After 20 minutes the mold is cooled, while still under pressure, to below 60° C. The pressure then is released, and the partially expanded body is removed from the mold and placed in an oven at 100° C. for 30 minutes to complete the expansion cycle. After standing overnight at room temperature, the foamed cellular body has a density of 27.2 pounds per cubic foot.

When the same formulation, but without the activator mixture, is milled and subjected to the molding procedure as just described, no foaming occurs; the resulting sample has an orange color, due to the continued presence of the undecomposed diisopropyl azodiformate, and has a density of 71.9 pounds per cubic foot.

Example 37

The formulation of Example 36 is milled, but the activator powder mixture is omitted, and in its place there is included an activator in the form of a metal salt of naphthenic acid, specifically lead naphthenate. The lead naphthenate is supplied to the mill as 2 grams of a solution of lead naphthenate in mineral spirits, the solution containing 24% lead by weight, or 0.48 gram of lead as lead naphthenate.

When the resulting modified plastisol is used to fill the square mold and then heated and blown as in Example 36, a foamed cellular body is obtained having a density of approximately 25 pounds per cubic foot.

Example 38

The following formulation is mixed in a Hobart mixer and on a three roll paint mill:

| | Grams |
|---|---|
| Polyvinyl chloride, low molecular weight dispersion grade (Marvinol VR53, U.S. Rubber) | 100 |
| Bis(2-ethylhexyl) phthalate | 65 |
| Butyl 2-ethylhexyl phthalate | 30 |
| Epoxy plasticizer (Rohm & Haas G–62) | 5 |
| Titanium dioxide | 5 |
| Diethyl azodiformate | 2 |
| Dibasic lead phthalate | 2 |
| Stannous stearate | 1 |

A wet film of this formulation 0.050 inch thick is cast on an aluminum plate and then placed in an oven preheated to 200° C. After 1.5 minutes at that temperature the foamed sample is removed from the oven and cooled, and the foam density is found to be 17.7 pounds per cubic foot.

The results with this formulation illustrate the synergistic improvement in activation of the decomposition of the azo diester by the simultaneous use of lead and tin compounds as the activator, the stannous stearate by itself being a weak activator. Thus if, instead of the stannous stearate, an equal weight of the dibasic lead phthalate is substituted, giving a total of 3 grams of the latter, the resultant product, prepared and foamed in an identical manner, is found to have a foam density of 26.5 pounds per cubic foot, indicating considerably less evolution of gas with the same proportions of diester and total activator.

COMPOSITIONS AND METHODS UTILIZING OTHER POLYMERS

Other polymeric materials also have been found to be useful for inclusion in compositions for producing cellular bodies upon heating which contain the diesters of azodiformic acid and the activators for stimulating release of gas therefrom, and such other polymeric materials likewise may be used in methods, embodying the invention, of making cellular bodies. The broad range of polymeric materials available for utilization in such compositions and methods has been indicated by a listing of illustrative polymers hereinabove. Examples of compositions for producing cellular bodies upon heating which include a number of these other polymeric materials are given hereinbelow.

Example 39

Polyester resins may be formulated with blowing materials and used to produce polyester foams in accordance with the invention. In general, any rigid, high molecular weight polyester, advantageously dissolved in a liquid monomer such as styrene to provide a suitably high viscosity, can exhibit the fluidity-temperature characteristic desired for the blowing compositions. In this example there is provided for this purpose an unsaturated polyester, dissolved in monomeric styrene, having a viscosity of 225 poises at 77° F. (Laminac Resin No. 4120, American Cyanamid Cc.). To this polyester resin the following ingredients are added in the proportions indicated by weight, the resin making up the balance of the formulation:

| | Percent |
|---|---|
| Diethyl azodiformate | 1.0 |
| Lead stearate | 1.0 |
| Aluminum palmitate | 4.0 |
| Polymerization initiator | 0.5 |

In this formulation the lead stearate provides the major activator action, the aluminum palmitate being added primarily as a thickener to provide a sufficiently high viscosity. Without this thickener upon heating the blowing gas simply bubbles out of the mix before it gels and the gas is lost. After gelation sets in no further foaming can occur, since the plastic mass then has become too rigid to expand. Thus the viscosity must be high enough prior to gelation to allow for expansion without appreciable loss of the blowing gas evolved. The polymerization initiator used in this example advantageously is a non-volatile alkyl dihydroperoxide, (1,1,4,4-tetramethyltetramethylene)dihydroperoxide or 2,5-dihydroperoxy-2,5-dimethylhexane.

A 15 gram sample of this formulation is charged in an aluminum cup 2 inches in diameter and 0.5 inch high, which then is placed in an oven preheated to 130° C. After 15 minutes the sample is removed from the oven and allowed to cool to room temperature. The sample is white and has a uniform cell structure. The foam density obtained is 28.7 pounds per cubic foot. A control sample, similarly formulated and treated but omitting the diethyl azodiformate, gives a density of 65 pounds per cubic foot.

Example 40

Phenolic resins also may be formulated with blowing materials and used to produce a foamed material in accordance with the invention. As an example 5 grams of a phenol-formaldehyde thermoplastic novolak resin containing 7% hexamethylenetetramine as a curing agent (Durez 21582, Hooker Electrochemical Co.) are mixed with 0.6 gram of 50% diethyl azodiformate in bis(2-ethylhexyl)phthalate and 0.3 gram of dibasic lead stearate. The resultant composition is placed in an aluminum dish and set for 10 minutes in an oven preheated to 150° C. The cured, foamed sample has a density of 7.9 pounds per cubic foot. A similar composition, but containing no azodiformate ester, treated in a similar manner, gives a cured sample having a density of 27.4 pounds per cubic foot.

*Example 41*

A foamed product of relatively low density also may be obtained readily with the use of epoxy resins. As an example, an epoxy resin formed by the condensation of epichlorohydrin and 4,4'-isopropylidenediphenol (bisphenol A) is used (No. 331, Dow Chemical Co.) in admixture with the following:

| | Grams |
|---|---|
| Epoxy resin | 20.0 |
| Aluminum palmitate | 0.4 |
| Diethylenetriamine, curing agent | 2.0 |
| Zinc 2-ethylhexanoate (22% solution in a hydrocarbon alcohol) | 0.4 |
| Diethyl azodiformate | 0.4 |

The zinc carboxylate serves as the primary activator for the decomposition of the azodiformate diester, while the aluminum palmitate acts as a thickener and supplementary activator. The resin is stirred after addition of each ingredient in the order given. Foaming commences immediately after the diethyl azodiformate is stirred in at room temperature. After 20 minutes at room temperature, the gelled foam is cured at 100° C. for about 15 minutes.

The resulting epoxy resin foam has a density of 18.8 pounds per cubic foot. If the diethyl azodiformate is omitted, however, no foaming occurs, and the cured resin when treated as above has a density of 74.2 pounds per cubic foot.

*Example 42*

As a further example of compositions and methods for producing cellular bodies, polyacrylonitrile elastomers are utilized. A polyvinyl chloride plastisol first is prepared from the following formulation by initial blending in a planetary mixer, followed by a single pass through a three roll paint mill:

| | Grams |
|---|---|
| Polyvinyl chloride resin (Diamond Alkali, #7103) | 100 |
| Bis(2-ethylhexyl) phthalate | 50 |
| Epoxidized soybean oil | 30 |
| Dibasic lead phosphite | 5 |
| Diethyl azodiformate | 4 |

This plastisol thus contains the gas-releasing material including the activator. A 50 gram sample of the plastisol is mixed intimately with 50 grams of a polyacrylonitrile elastomer in the form of an acrylonitrile-butadiene-styrene rubber in powder form (Hycar 1411, B. F. Goodrich Co.). An aluminum cup is filled, but only partially, with the resultant mixture and then placed in an oven preheated to 175° C. After 15 minutes in the oven at this temperature, the foamed specimen is removed and is observed to have expanded to fill the cup. If the ethyl diester is omitted from the formulation, however, no expansion occurs.

It will be understood that other polyacrylonitrile rubbers may be used, with or without associated polymeric materials or plasticizers, provided that the viscosity requirements for successful blowing are afforded by the rubber material, the above-mentioned acrylonitrile-butadiene-styrene rubber having chosen for purpose of exemplification. As elastomers providing equivalent results there may be mentioned, by way of further example, the chloroprene rubbers, which are polymers of chlorinated butadiene or of chlorinated 2-methylbutadiene.

ADDITIONAL DATA ON GAS EVOLUTION AZODIFORMIC ACID DIESTER-ACTIVATOR COMPOSITIONS

To determine the effects of various activators on various azodiformates over a range of temperatures, numerous additional tests have been made. These tests were made with approximately equal weights of the specified diester and of the activator material, approximately 30 mg. of each being placed in a stoppered tube, communicating with one leg of a calibrated U-tube containing mercury, and placed in a bath maintained at the test temperature.

Guided by the results of these additional tests, those familiar with the techniques of blowing or foaming of polymeric organoplastic materials as presently practiced will have no difficulty, in the light of the examples and discussion set forth hereinabove, in utilizing numerous other combinations of diesters of azodiformic acid and metallic activator compounds to formulate gas-producing compositions, and also in formulating many modified and different blowing compostions for producing cellular bodies upon heating. Thus the latter compositions may include any desired polymeric material exhibiting a suitable fluidity-temperature characteristic.

Considering for example the polyvinyl chloride blowing compositions, it will be appreciated that the organoplastic materials in these blowing compositions need not be present in plastisol form, although vinyl plastisols have been found to be especially adaptable for a variety of blowing or foaming techniques. This is illustrated by the inclusion, in many of the examples given above which utilize vinyl chloride polymeric materials, of dispersion grade polyvinyl chlorides from several sources and embodying the well known minor individual variations in degree of polymerization, specific viscosity, and the like, characteristic of the various readily available dispersion grade materials. Mixtures of polyvinyl chloride and plasticizers also are known, for example, in which the polyvinyl chloride is present in intimate mixture with a solvent-type plasticizer, but which contain insufficient plasticizer to produce a plastisol with the vinyl resin used; in this case a flowable but substantially dry mix is obtained. These products, as well as essentially unplasticized vinyl resins, ordinarily exhibit fluidity-temperature characteristics permitting, within some temperature range, formation of cellular structure upon heating and consequent release of gas, a suitably activated gas-releasing material of course being admixed with the product to supply the gas.

Thus Example 35 utilizes a non-dispersion grade of polyvinyl chloride, made by suspension polymerization rather than emulsion polymerization, having high absorption for plasticizers, and thus giving a dry mix with amounts of plasticizer of the order of 60 to 80 parts per 100 parts by weight of the resin. The molding techniques of Examples 25 and 36 are also used with the composition set forth in Example 35 to get vinyl foam bodies of similar density. In general, it is within the ordinary ability of those skilled in the blowing and foaming arts to make routine tests on any polymeric plastic or resin material, including the vinyl halide polymeric materials, whether with or without plasticizers, to determine suitable temperature and other conditions for producing cellular bodies utilizing such material. The present invention then makes available a wide choice of blowing compound-activator combinations from which, with the exercise of routine technical skill and judgment, there may be chosen activated gas-releasing materials for incorporation in the organoplastic to provide the desired degree of blowing at the desired restricted range of temperature.

To illustrate the effectivness of the activators utilized in accordance with the present invention, test results also are reported which were obtained by heating various diesters of azodiformic acid in the absence of any activator. The results of the above-mentioned additional tests, with and without activators, are summarized in Table III.

TABLE III.—GAS EVOLVED BY AZODIFORMIC ACID ESTERS

| Ester | Activator | Medium | Time, min. | Temp., °C. | Gas Evolved, ml./g. (S.T.P.) |
|---|---|---|---|---|---|
| Diethyl | None | None | 60 | 130 | 0 |
| Do | do | DOP [1] | 60 | 130 | 0 |
| Do | do | None | 60 | 180 | 0 |
| Do | do | DOP | 60 | 180 | 0 |
| Do | do | DOP | 60 | 200 | 10 |
| Do | do | None | 60 | 200 | 38 |
| Do | do | DOP | 60 | 225 | 38 |
| Do | do | DOP | 60 | 240 | 57 |
| Do | Dibasic lead phosphite | DOP | 12 | 100 | 28 |
| Do | do | None | 12 | 100 | 99 |
| Do | do | DOP | 60 | 100 | 240 |
| Do | do | None | 3 | 165 | 233 |
| Do | do | DOP | 12 | 165 | 102 |
| Do | do | DOP | 12 | 200 | 194 |
| Do | Lead oxide | DOP | 12 | 150 | 235 |
| Do | Lead 2-ethylhexanoate (pure) | DOP | 12 | 100 | 216 |
| Do | Lead 2-ethylhexanoate (13.9% Pb) | DOP | 6 | 165 | 264 |
| Do | Lead naphthenate (24% Pb) | DOP | 7 | 25 | 0 |
| Do | do | DOP | 103 | 25 | 205 |
| Do | do | DOP | 12 | 130 | 225 |
| Do | do | DOP | 60 | 130 | 246 |
| Do | Lead phthalate (dibasic) | DOP | 30 | 165 | 18 |
| Do | Lead stearate | DOP | 12 | 100 | 233 |
| Do | Lead phosphite-stearate, PbO.PbHPO₃. 1/2H₂O.Pb(C₁₇H₃₅COO)₂. | DOP | 12 | 130 | 268 |
| Do | Cadmium stearate | DOP | 12 | 150 | 233 |
| Do | Cadmium laurate | DOP | 12 | 150 | 197 |
| Do | Zinc laurate | None | 12 | 130 | 192 |
| Do | do | do | 30 | 130 | 212 |
| Do | do | DOP | 12 | 165 | 134 |
| Do | do | None | 12 | 200 | 225 |
| Do | do | do | 60 | 200 | 244 |
| Do | Zinc octanoate | DOP | 12 | 130 | 152 |
| Do | Zinc naphthenate (6% Zn) | DOP | 12 | 130 | 12 |
| Do | do | DOP | 60 | 130 | 72 |
| Do | Zinc stearate | DOP | 12 | 165 | 138 |
| Do | Zinc oxide | None | 30 | 130 | Over 75 |
| Do | Magnesium palmitate | do | 12 | 130 | 173 |
| Do | do | do | 60 | 130 | 242 |
| Do | do | DOP | 12 | 130 | 11 |
| Do | do | DOP | 12 | 200 | 186 |
| Do | do | None | 6 | 200 | 237 |
| Do | Talc (Mistron vapor) | do | 30 | 180 | 34 |
| Do | Calcium 2-ethylhexanoate (5% Ca) | DOP | 12 | 200 | 102 |
| Do | Calcium napthenate (4% Ca) | DOP | 12 | 130 | 13 |
| Do | do | DOP | 60 | 130 | 56 |
| Do | do | DOP | 12 | 180 | 83 |
| Do | do | DOP | 60 | 180 | 117 |
| Do | Calcium stearate | DOP | 30 | 180 | 34 |
| Do | Calcium silicate (Micro-Cel) | None | 30 | 180 | 164 |
| Do | Barium stearate | DOP | 30 | 200 | 20 |
| Do | Ceric sulfate | None | 60 | 95 | 73 |
| Do | Ceric ammonium sulfate Ce(NH₄)(SO₄)₂ | do | 60 | 95 | 0 |
| Do | Copper naphthenate (8% Cu) | DOP | 12 | 130 | 25 |
| Do | do | DOP | 60 | 130 | 65 |
| Do | Lithium stearate | DOP | 30 | 200 | 42 |
| Do | Lithium hydroxystearate | DOP | 30 | 165 | 16 |
| Do | Aluminum palmitate | None | 12 | 130 | 98 |
| Do | do | do | 60 | 130 | 117 |
| Do | do | DOP | 60 | 130 | 2 |
| Do | do | DOP | 12 | 200 | 59 |
| Do | do | None | 12 | 200 | 127 |
| Do | do | do | 60 | 200 | 150 |
| Do | Boron trifluoride etherate | DOP | 30 | 165 | 65 |
| Do | Silica (Hi Sil 233) | DOP | 30 | 150 | 24 |
| Do | do | None | 30 | 180 | 115 |
| Do | Perlite fines | do | 30 | 230 | 80 |
| Do | Zirconium naphthenate (6% Zr) | DOP | 60 | 130 | 73 |
| Do | Stannous 2-ethylhexanoate (28% Sn) | None | 9 | 130 | 139 |
| Do | do | DOP | 60 | 130 | 0 |
| Do | do | DOP | 12 | 200 | 129 |
| Do | do | None | 12 | 200 | 172 |
| Do | do | do | 60 | 200 | 197 |
| Do | do | DOP | 60 | 200 | 126 |
| Do | Vanadium naphthenate (3% V) | None | 12 | 130 | 51 |
| Do | do | do | 60 | 130 | 70 |
| Do | do | DOP | 60 | 130 | 16 |
| Do | do | None | 12 | 200 | 110 |
| Do | do | do | 60 | 200 | 156 |
| Do | do | DOP | 12 | 200 | 60 |
| Do | do | DOP | 60 | 200 | 93 |
| Do | Manganese naphthenate (6% Mn) | DOP | 37 | 165 | 179 |
| Do | Iron naphthenate (6% Fe) | None | 12 | 130 | 77 |
| Do | do | do | 60 | 130 | 117 |
| Do | do | DOP | 60 | 130 | 18 |
| Do | do | None | 12 | 200 | 202 |
| Do | do | do | 60 | 200 | 211 |
| Do | do | DOP | 12 | 200 | 86 |
| Do | do | DOP | 60 | 200 | 106 |
| Do | Iron distearate | DOP | 30 | 165 | 21 |
| Do | Mixture of zinc and potassium fatty acid salts (4% Zn, 3.3% K). | DOP | 12 | 100 | 2 |
| Do | do | DOP | 60 | 100 | 140 |
| Do | do | DOP | 12 | 165 | 148 |
| Do | 1:1 Mixture of cadmium and zinc stearates | DOP | 30 | 130 | 162 |
| Do | 2:2:1 Mixture and cadmium, zinc, and barium stearates. | DOP | 12 | 150 | 187 |
| Do | Mixture of cadmium, zinc, and potassium fatty acid salts (2.2% Cd, 2.4% Zn, 3.3% K). | DOP | 12 | 100 | 77 |
| Do | do | DOP | 60 | 100 | 168 |
| Do | do | DOP | 12 | 165 | 172 |

TABLE III—Continued

| Ester | Activator | Medium | Time, min. | Temp., °C. | Gas Evolved, ml./g. (S.T.P.) |
|---|---|---|---|---|---|
| Do | Mixture of barium, zinc, cadmium, calcium, strontium, and magnesium fatty acid salts. | None | 12 | 100 | 63 |
| Do | (Mixture of barium, zinc, cadmium, calcium, strontium, and magnesium fatty acid salts). | do | 60 | 100 | 276 |
| Do | do | do | 12 | 165 | 286 |
| Do | do | DOP | 12 | 200 | 220 |
| Do | do | DOP | 60 | 200 | 227 |
| Diisopropyl | None | DOP | 60 | 190 | 15 |
| Do | do | DOP | 60 | 210 | 53 |
| Do | do | DOP | 60 | 225 | 74 |
| Do | do | DOP | 60 | 240 | 152 |
| Do | do | DOP | 60 | 260 | 157 |
| Do | do | TCP² | 316 | 238 | 337 |
| Do | Dibasic lead phosphite | DOP | 60 | 100 | 16 |
| Do | do | DOP | 60 | 165 | 33 |
| Do | do | None | 60 | 100 | 129 |
| Do | do | do | 12 | 165 | 189 |
| Do | Lead phosphite-stearate, Pb.PbHPO₃.1/2H₂O.Pb(C₁₇H₃₅COO)₂. | DOP | 12 | 150 | 234 |
| Do | Lead phosphite-benzoate PbHPO₃.1/2H₂O.2Pb(C₆H₅COO)₂. | DOP | 12 | 130 | 175 |
| Do | Lead oxide | DOP | 12 | 180 | 212 |
| Do | Lead 2-ethylhexanoate (13.9% Pb) | DOP | 60 | 100 | 170 |
| Do | Lead 2-ethylhexanoate (pure) | DOP | 12 | 130 | 235 |
| Do | Lead stearate | DOP | 1 | 150 | 218 |
| Do | Zinc laurate | DOP | 12 | 180 | 119 |
| Do | Zinc octanoate | DOP | 12 | 130 | 144 |
| Do | Zinc stearate | DOP | 12 | 130 | 68 |
| Do | Cadmium laurate | DOP | 12 | 180 | 197 |
| Do | Cadmium stearate | DOP | 12 | 150 | 140 |
| Do | 2:2:1 Mixture of cadmium, zinc, and barium stearates. | DOP | 12 | 165 | 182 |
| Do | Mixture of zinc and potassium fatty acid salts (4.0% Zn, 3.3% K). | DOP | 60 | 100 | 109 |
| Do | do | DOP | 30 | 165 | 135 |
| Do | Mixture of cadmium, zinc, and potassium fatty acid salts (2.2% Cd, 2.4% Zn, 3.3% K). | DOP | 60 | 100 | 106 |
| Do | do | DOP | 12 | 165 | 136 |
| Do | do | DOP | 60 | 165 | 170 |
| Do | Mixture of barium, zinc, cadmium, calcium, strontium, and magnesium fatty acid salts. | DOP | 60 | 100 | 15 |
| Do | do | None | 60 | 100 | 72 |
| Do | do | DOP | 30 | 165 | 190 |
| Do | do | DOP | 60 | 165 | 213 |
| Do | do | None | 12 | 165 | 223 |
| Do | do | do | 30 | 165 | 250 |
| Dibutyl | None | DOP | 60 | 240 | 26 |
| Do | Dibasic lead phosphite | DOP | 12 | 200 | 88 |
| Diisobutyl | None | DOP | 60 | 240 | 9 |
| Do | Dibasic lead phosphite | DOP | 12 | 200 | 98 |
| Do | do | DOP | 3 | 240 | 112 |
| Didodecyl | None | DOP | 30 | 235 | 0 |
| Do | do | None | 30 | 235 | 0 |
| Do | Mixture of zinc, cadmium and potassium fatty acid salts (2.2% Cd, 2.4% Zn, 3.3% K). | DOP | 12 | 235 | 42 |
| Dimethyl | None | DOP | 30 | 150 | 0 |
| Do | do | None | 30 | 150 | 4 |
| Do | do | do | 12 | 190 | 132 |
| Do | do | do | 45 | 190 | 198 |
| Do | Dibasic lead phosphite | DOP | 12 | 170 | 165 |
| Do | do | DOP | 30 | 170 | 176 |
| Do | do | None | 3 | 170 | 191 |
| Do | do | do | 50 | 170 | 236 |
| Do | Lead phosphite-stearate, PbO.PbHPO₃.1/2H₂O.Pb(C₁₇H₃₅COO)₂. | DOP | 12 | 130 | 314 |
| Do | Lead phosphite-octeate, PbO.PbHPO₃.1/2H₂O.Pb(C₇H₁₅COO)₂. | DOP | 12 | 130 | 279 |
| Do | Lead phosphite-benzoate, PbO.PbHPO₃.1/2H₂O.Pb(C₆H₅COO)₂. | DOP | 12 | 130 | 252 |
| Do | Lead 2-ethylhexanoate (pure) | DOP | 12 | 100 | 249 |
| Do | Lead 2-ethylhexanoate (13.9% Pb) | DOP | 3 | 130 | 212 |
| Do | Lead 2-ethylhexanoate (13.9% Pb) | DOP | 40 | 130 | 342 |
| Do | Lead stearate | DOP | 12 | 100 | 287 |
| Do | Cadmium laurate | DOP | 12 | 150 | 271 |
| Do | Cadmium stearate | DOP | 12 | 130 | 250 |
| Do | Zinc octanoate | DOP | 12 | 130 | 185 |
| Do | Zinc stearate | DOP | 12 | 150 | 157 |
| Do | 1:1 Mixture of cadmium and zinc stearates | DOP | 12 | 130 | 157 |
| Do | 2:2:1 Mixture of cadmium, zinc, and barium stearates. | DOP | 12 | 130 | 180 |
| Do | 2:1:2 Mixture of cadmium, zinc, and barium stearates. | DOP | 12 | 150 | 225 |
| Do | Mixture of zinc and potassium fatty acid salts (4.0% Zn, 3.3% K). | DOP | 180 | 25 | 0 |
| Do | do | DOP | 20 hours | 25 | 134 |
| Do | do | DOP | 6 min. | 130 | 192 |
| Do | do | DOP | 60 | 130 | 218 |
| Do | Mixture of cadmium, zinc, and potassium fatty acid salts (2.2% Cd, 2.4% Zn, 3.3% K). | DOP | 72 | 25 | 0 |
| Do | do | DOP | 20 hours | 25 | 157 |
| Do | do | DOP | 12 min. | 130 | 192 |
| Do | do | DOP | 45 | 130 | 239 |
| Do | Mixture of barium, zinc, cadmium, calcium, strontium and magnesium fatty acid salts. | DOP | 3 | 170 | 260 |

TABLE III—Continued

| Ester | Activator | Medium | Time, min. | Temp., °C. | Gas Evolved, ml./g. (S.T.P.) |
|---|---|---|---|---|---|
| Do | do | None | 3 | 170 | 260 |
| Do | do | do | 6 | 170 | 342 |
| Bis(2-chloroethyl) | None | DOP | 60 | 200 | 0 |
| Do | do | DOP | 60 | 240 | 9 |
| Do | Dibasic lead phosphite | DOP | 12 | 200 | 56 |
| Do | do | DOP | 12 | 240 | 96 |
| Do | do | None | 3 | 240 | 228 |
| Diallyl | None | DOP | 60 | 120 | 0 |
| Do | Mixture of zinc and potassium fatty acid salts (4.0% Zn, 3.3% K). | DOP | 12 | 120 | 38 |
| Do | do | DOP | 60 | 120 | 50 |
| Bis(1,1-dimethyl-2-propynyl) | None | DOP | 24 | 200 | 39 |
| Do | do | DOP | 12 | 240 | 75 |
| Do | Dibasic lead phosphite | None | 3 | 240 | 169 |
| Diphenyl | None | DOP | 60 | 240 | 31 |
| Do | Dibasic lead phosphite | DOP | 12 | 240 | 70 |
| Do | do | DOP | 30 | 240 | 84 |
| Diethylene bis(monoethyl azodiformate) | None | None | 60 | 195 | 66 |
| Do | do | do | 12 | 215 | 72 |
| Do | do | do | 60 | 215 | 109 |
| Do | do | DOP | 12 | 215 | 10 |
| Do | do | DOP | 60 | 215 | 13 |
| Do | Mixture of cadmium, zinc, and potassium fatty acid salts (2.2% Cd, 2.4% Zn, 3.3% K). | DOP | 3 | 215 | 209 |
| Do | do | DOP | 21 | 215 | 216 |

[1] Bis(2-ethylhexyl) phthalate, "di-octyl phthalate."
[2] Tritolyl phosphate.

The diesters of azodiformic acid utilized in accordance with the invention may be prepared by known methods. For example, the corresponding alcohol, phenol, or glycol is treated with phosgene, followed by reacting the resulting chloroformates with the appropriate hydrazine to obtain the corresponding hydrazodiformates, which then are oxidized to the corresponding azodiformates. Diesters of azodiformic acid of the general structure

R.OCO.N:N.COO.R thus may be prepared by employing generally the procedure of N. Rabjohn, "Organic Syntheses," vol. 28, page 58, with minor modifications as needed. In this procedure the selected alkyl, aryl, or aralkyl chloroformate is treated with 85% hydrazine hydrate to obtain the corresponding diester of hydrazodiformic acid, which subsequently is oxidized with aqueous chlorine to the corresponding diester of azodiformic acid. The chloroformates are synthesized by methods known from the literature.

In this way the following symmetrical diesters of azodiformic acid have been obtained in excellent yields: ethyl, orange liquid, B.P. 89–90° C./1.8 mm.; isobutyl, orange liquid; n-butyl, orange liquid; 2-chloroethyl, orange solid, M.P. 40–42° C.; benzyl yellow solid, M.P. 48.5–50.5° C.; cyclohexyl, yellow solid, M.P. 71–73° C.; isopropyl, orange liquid, B.P. 75.5° C./0.25 mm.; sec-butyl, orange liquid; dodecyl, orange solid, M.P. 30–32° C.; tert-butyl, yellow solid, M.P. 90–92° C.; 1,1-dimethyl-2-propynyl, orange liquid; phenyl, orange solid, M.P. 119° C.; allyl, orange liquid; and methyl, orange liquid. The diphenyl hydrazodiformate was oxidized to the azo ester with ammonium nitrate according to the procedure disclosed and claimed in Patent No. 3,017,406, assigned to the same assignee as that of the present invention. The diallyl hydrazodiformate was oxidized to the azo ester with silver oxide.

Structure proofs and purity of the compounds were determined with the aid of infrared spectroscopy and hydrogen iodide titration of the azo linkage.

As a further illustration of the preparation of such diesters, a novel and preferred method of preparing dimethyl azodiformate is set forth in detail in the aforesaid copending application Serial No. 329,301, filed December 9, 1963. This and related methods which may be employed advantageously for preparing azodiformate diesters are disclosed and claimed in the copending application Serial No. 337,124, filed January 13, 1964, in the names of Chester S. Sheppard, Herman P. Van Leeuwen, and Orville L. Mageli and assigned to the same assignee as that of the present invention.

The ester of diethylene glycol with monoethyl azodiformate, or diethylene bis(ethyl azodiformate), may be prepared according to the procedure described by N. Rabjohn in the Journal of the American Chemical Society, vol. 70, page 1182 (1948). Diethylene glycol is treated with phosgene to obtain the bis(chloroformate). The product is treated with ethyl carbazate (prepared from diethyl carbonate and 85% hydrazine hydrate) to obtain the diethylene bis(ethyl hydrazodiformate), which subsequently is oxidized with aqueous chlorine to the desired corresponding azo ester. This diester is a red, clear liquid. The infrared spectrum and hydrogen iodide titration show that the product thus obtained is in quite pure form.

While there have been described what at present are considered to be the preferred embodiments of this invention, it will be obvious to those skilled in the art that various changes and modifictaions may be made therein without departing from the invention. It is aimed, therefore, in the appended claims to cover all such changes and modifications which fall within the true spirit and scope of the invention.

What is claimed is:
1. A gas-producing composition, consisting essentially of: a diester of azodiformic acid represented by the structural formula $R^1.OCO.N:N.COO.R^2$; the radical $—R^1$ being selected from the group consisting of (a) alkyl, haloalkyl, aralkyl, cycloalkyl, alkenyl, alkynyl, phenyl, halophenyl, and alkylphenyl radicals having not more than 12 carbon atoms, and (b) the radical

$R^2.OCO.N:N.COO.R^3—$ in which $—R^3—$ is selected from the group consisting of the radical $—(C_mH_{2m})—$ where $m$ is a number from 2 to 10, and of the radical $—CH_2.CH_2(Y.CH_2.CH_2)_n—$ where $n$ is a number from 1 to 3 and $Y$ is selected from the group consisting of oxygen and sulfur; the radical $—R^2$ being selected from the group consisting of the said radicals (a); and an activator for promoting gas-releasing decomposition of said diester of azodiformic acid at elevated temperatures, in the form of at least one metallic compound having unneutralized Lewis acid properties and distributed throughout said composition in an amount by weight equal to at least 1% of the weight of said diester.

2. The gas-producing composition of claim 1, in which said activator is a tin salt of a carboxylic acid in admixture with a basic lead salt.

3. A composition for producing cellular bodies upon heating, comprising: a polymeric material exhibiting a fluidity-temperature characteristic permitting formation of cellular structure upon heating and consequent release of gas throughout a body of said material; a material for releasing gas upon heating, distributed throughout said composition in the form of a diester of azodiformic acid represented by the structural formula $$R^1.OCO.N:N.COO.R^2$$

the radical —$R^1$ being selected from the group consisting of (a) alkyl, haloalkyl, aralkyl, cycloalkyl, alkenyl, alkynyl, phenyl, halophenyl, and alkylphenyl radicals having not more than 12 carbon atoms, and of (b) the radical $R^2.OCO.N:N.COO.R^3$—, in which —$R^3$— is selected from the group consisting of the radical —$(C_mH_{2m})$— where $m$ is a number from 2 to 10 and of the radical $$-CH_2.CH_2(Y.CH_2.CH_2)_n-$$

where $n$ is a number from 1 to 3 and Y is selected from the group consisting of oxygen and sulfur, and the radical —$R^2$ being selected from the group consisting of the said radicals (a); and an activator for said gas-releasing material, distributed throughout said composition in the form of at least one metallic compound having unneutralized Lewis acid properties.

4. The composition of claim 3, in which said activator is a tin salt of a carboxylic acid in admixture with a basic lead salt.

5. A composition for producing cellular bodies upon heating, comprising: a polyolefin hydrocarbon material exhibiting a fluidity-temperature characteristic permitting formation of cellular structure upon heating and consequent release of gas throughout a body of said material; a material for releasing gas upon heating, distributed throughout said composition in the form of a diester of azodiformic acid represented by the structural formula $R^1.OCO.N:N.COO.R^2$, the radical —$R^1$ being selected from the group consisting of (a) alkyl, haloalkyl, aralkyl, cycloalkyl, alkenyl, alkynyl, phenyl, halophenyl, and alkylphenyl radicals having not more than 12 carbon atoms, and of (b) the radical $R^2.OCO.N:N.COO.R^3$—, in which —$R^3$— is selected from the group consisting of the radical —$(C_mH_{2m})$— where $m$ is a number from 2 to 10 and of the radical —$CH_2.CH_2(Y.CH.CH_2)_n$— where $n$ is a number from 1 to 3 and Y is selected from the group consisting of oxygen and sulfur, and the radical —$R^2$ being selected from the group consisting of the said radicals (a); and an activator for said gas-releasing material, distributed throughout said composition in the form of at least one metallic compound having unneutralized Lewis acid properties.

6. A composition for producing cellular bodies upon heating, comprising: a quantity of pellets made up of a polyolefin hydrocarbon material, constituting a major proportion by weight of said composition and exhibiting a fluidity-temperature characteristic permitting formation of cellular structure upon heating to effect coalescence of said pellets at an elevated temperature above the softening temperature of said material and to effect release of gas throughout the body of said coalesced pellets; at least one metallic gas-releasing-activator compound having unneutralized Lewis acid properties, constituting a minor proportion of said composition, and present in homogeneous admixture with said polyolefin hydrocarbon material in said pellets; and a material for releasing gas upon heating, constituting a minor proportion of said composition, present as a coating on said pellets, and having the form of a diester of azodiformic acid represented by the structural formula R.OCO.N:N.COO.R, in which the radical —R is an alkyl radical having from 2 to 12 carbon atoms each of which carries at least one hydrogen atom.

7. A composition for producing cellular bodies upon heating, comprising: a vinyl chloride polymeric material exhibiting a fluidity-temperature characteristic permitting formation of cellular structure upon heating and consequent release of gas throughout a body of said material; a material for releasing gas upon heating, distributed throughout said composition in the form of a diester of azodiformic acid represented by the structural formula $R^1.OCO.N:N.COO.R^2$, the radical —$R^1$ being selected from the group consisting of (a) alkyl, haloalkyl, aralkyl, cycloalkyl, alkenyl, alkynyl, phenyl, halophenyl, and alkylphenyl radicals having not more than 12 carbon atoms, and of (b) the radical $R^2.OCO.N:N.COO.R^3$—, in which —$R^3$— is selected from the group consisting of the radical —$(C_mH_{2m})$— where $m$ is a number from 2 to 10 and of the radical —$CH_2.CH_2(Y.CH_2.CH_2)_n$— where $n$ is a number from 1 to 3 and Y is selected from the group consisting of oxygen and sulfur, and the radical —$R^2$ being selected from the group consisting of the said radicals (a); and an activator for said gas-releasing material, distributed throughout said composition in the form of at least one metallic compound having unneutralized Lewis acid properties.

8. The composition of claim 7, in which said activator is a tin salt of a carboxylic acid in admixture with a basic lead salt.

9. The method of making cellular bodies, comprising: forming a mixture including a polymeric material exhibiting a fluidity-temperature characteristic permitting formation of cellular structure upon release of gas throughout a body of said material at an elevated temperature, incorporating in said mixture a material for releasing gas upon heating, and incorporating in said mixture an activator for said gas-releasing material; said gas-releasing material being a diester of azodiformic acid represented by the structural formula $R^1.OCO.N:N.COO.R^2$, the radical —$R^1$ being selected from the group consisting of (a) alkyl, haloalkyl, aralkyl, cycloalkyl, alkenyl, alkynyl, phenyl, halophenyl, and alkylphenyl radicals having not more than 12 carbon atoms, and of (b) the radical $R^2.OCO.N:N.COO.R^3$—, in which —$R^3$— is selected from the group consisting of the radical —$(C_mH_{2m})$— where $m$ is a number from 2 to 10 and of the radical —$CH_2.CH_2(Y.CH_2.CH_2)_n$— where $n$ is a number from 1 to 3 and Y is selected from the group consisting of oxygen and sulfur, and the radical —$R^2$ being selected from the group consisting of the said radicals (a); said activator being at least one metallic compound having unneutralized Lewis acid properties; and heating a portion of said mixture to effect gas-releasing decomposition of said diester of azodiformic acid, at a rate of gas release determined by the presence of said activator under the elevated temperature conditions attained, for expanding said portion of the mixture into a cellular body.

10. The method of claim 9 for making cellular bodies, in which both a tin salt of a carboxylic acid and a basic lead salt are incorporated in the mixture as said activator.

11. The gas-producing composition of claim 1, in which the diester of azodiformic acid is selected from the group consisting of the dimethyl ester, the diethyl ester, the diisopropyl ester, the di-tert-butyl ester, and diethylene bis(monoethyl azodiformate).

12. The gas-producing composition of claim 1, in which at least said one metallic activator compound, having unneutralized Lewis acid properties, is selected from the group consisting of such compounds of zinc, cadmium, mercury, tin, lead, titanium, vanadium, chromium, manganese, iron, cobalt, nickel, copper, and silver.

13. The composition of claim 3, in which said gas-releasing material distributed throughout said composition is a diester of azodiformic acid selected from the group consisting of the dimethyl ester, the diethyl ester, the diisopropyl ester, the di-tert-butyl ester, and diethylene bis(monoethyl azodiformate).

14. The composition of claim 3, in which at least said one metallic activator compound, having unneutralized Lewis acid properties, is selected from the group consisting of such compounds of zinc, cadmium, mercury, tin, lead, titanium, vanadium, chromium, manganese, iron, cobalt, nickel, copper, and silver.

15. The composition of claim 3, in which the polymeric material exhibiting said fluidity-temperature characteristic is selected from the group consisting of polyolefin hydrocarbon materials, vinyl chloride polymeric materials, polyester resins, phenolic resins, epoxy resins, and polyacrylonitrile elastomers.

16. The composition of claim 15, in which at least said one metallic activator compound, also present in said composition and having unneutralized Lewis acid properties, is selected from the group consisting of such compounds of zinc, cadmium, mercury, tin, lead, titanium, vanadium, chromium, manganese, iron, cobalt, nickel, copper, and silver.

17. The composition of claim 5, in which said gas-releasing material distributed throughout said composition is a diester of azodiformic acid selected from the group consisting of the dimethyl ester, the diethyl ester, the diisopropyl ester, the di-tert-butyl ester, and diethylene bis(monoethyl azodiformate).

18. The composition of claim 5, in which at least said one metallic activator compound, having unneutralized Lewis acid properties, is selected from the group consisting of such compounds of zinc, cadmium, mercury, tin, lead, titanium, vanadium, chromium, manganese, iron, cobalt, nickel, copper, and silver.

19. The composition of claim 7, in which said gas-releasing material distributed throughout said composition is a diester of azodiformic acid selected from the group consisting of the dimethyl ester, the diethyl ester, the diisopropyl ester, the di-tert-butyl ester, and diethylene bis(monoethyl azodiformate).

20. The composition of claim 7, in which at least said one metallic activator compound, having unneutralized Lewis acid properties, is selected from the group consisting of such compounds of zinc, cadmium, mercury, tin, lead, titanium, vanadium, chromium, manganese, iron, cobalt, nickel, copper, and silver.

21. The composition of claim 7, in which a plasticizer is present.

22. The method of claim 9 for making cellular bodies, in which the gas-releasing material incorporated in said mixture is a diester of azodiformic acid selected from the group consisting of the dimethyl ester, the diethyl ester, the diisopropyl ester, the di-tert-butyl ester, and diethylene bis(monoethyl azodiformate).

23. The method of claim 9 for making cellular bodies, in which at least said one metallic activator compound, incorporated in said mixture and having unneutralized Lewis acid properties, is selected from the group consisting of such compounds of zinc, cadmium, mercury, tin, lead, titanium, vanadium, chromium, manganese, iron, cobalt, nickel, copper, and silver.

24. The method of claim 9 for making cellular bodies, in which the polymeric material, used in forming said mixture and having said fluidity-temperature characteristic, is selected from the group consisting of polyolefin hydrocarbon materials, vinyl chloride polymeric materials, polyester resins, phenolic resins, epoxy resins, and polyacrylonitrile elastomers.

25. The method of claim 24, in which at least said one metallic activator compound, incorporated in the mixture including said polymeric material and having unneutralized Lewis acid properties, is selected from the group consisting of such compounds of zinc, cadmium, mercury, tin, lead, titanium, vanadium, chromium, manganese, iron, cobalt, nickel, copper, and silver.

26. The method of claim 9 for making cellular bodies, in which the polymeric material, used in forming said mixture, is a vinyl chloride polymeric material and in which a plasticizer for said vinyl chloride polymeric material is present.

27. The method of claim 9 for making cellular bodies, in which the polymeric material used in forming said mixture is extrudable and in which, prior to the step of said heating of a portion of the mixture, such portion is shaped by charging into an extruder wherein the mixture is confined within the extruder barrel and die until extruded from the die, the extruder barrel and die being subjected to said heating to cause softening of said mixture and to effect said gas-releasing decomposition of said diester of azodiformic acid, at a rate of gas release determined by the presence of said activator under the elevated temperature conditions attained by said shaped portion of the mixture, for expanding said portion upon leaving the extruder die into a cellular body.

28. The composition of claim 17, in which at least said one metallic activator compound, having unneutralized Lewis acid properties, is selected from the group consisting of such compounds of zinc, cadmium, mercury, tin, lead, titanium, vanadium, chromium, manganese, iron, cobalt, nickel, copper, and silver.

29. The composition of claim 21, in which said gas-releasing material distributed throughout said composition is a diester of azodiformic acid selected from the group consisting of the dimethyl ester, the diethyl ester, the diisopropyl ester, the di-tert-butyl ester, and diethylene bis (monoethyl azodiformate), and in which at least said one metallic activator compound, having unneutralized Lewis acid properties, is selected from the group consisting of such compounds of zinc, cadmium, mercury, tin, lead, titanium, vanadium, chromium, manganese, iron, cobalt, nickel, copper, and silver.

30. The method of claim 26 for making cellular bodies, in which both a tin salt of a carboxylic acid and a basic lead salt are incorporated in the mixture as said activator.

References Cited by the Examiner

UNITED STATES PATENTS

| | | | |
|---|---|---|---|
| 2,075,543 | 3/1937 | Reed et al. | 260—45.75 |
| 2,446,976 | 8/1948 | Cousins | 260—45.85 |
| 2,945,828 | 7/1960 | Henning | 260—2.5 |
| 2,964,799 | 12/1960 | Roggi et al. | 260—2.5 |
| 3,017,406 | 1/1962 | Mehr | 260—2.5 |
| 3,197,423 | 7/1965 | Ackerman | 260—2.5 |

MURRAY TILLMAN, *Primary Examiner.*

M. FOELAK, *Assistant Examiner.*